US012633693B2

(12) United States Patent
Xiao et al.

(10) Patent No.: US 12,633,693 B2
(45) Date of Patent: May 19, 2026

(54) CONNECTOR ASSEMBLY AND CABLE ASSEMBLY WITH HIGH-SPEED TERMINALS

(71) Applicant: HUAWEI TECHNOLOGIES CO., LTD., Guangdong (CN)

(72) Inventors: Jianping Xiao, Dongguan (CN); Tien Chieh Su, Shanghai (CN); Long Jiao, Shanghai (CN); Tianhua Liu, Dongguan (CN); Dongdong Shen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 18/262,015

(22) PCT Filed: Jan. 20, 2022

(86) PCT No.: PCT/CN2022/072951

§ 371 (c)(1),
(2) Date: Jul. 19, 2023

(87) PCT Pub. No.: WO2022/156742

PCT Pub. Date: Jul. 28, 2022

(65) Prior Publication Data

US 2024/0305027 A1 Sep. 12, 2024

(30) Foreign Application Priority Data

Jan. 21, 2021 (CN) ......................... 202110082751.2
Mar. 2, 2021 (CN) ......................... 202110229110.5

(51) Int. Cl.
*H01R 13/02* (2006.01)
*H01R 13/652* (2006.01)
(Continued)

(52) U.S. Cl.
CPC ........... *H01R 13/02* (2013.01); *H01R 13/652* (2013.01); *H01R 13/6582* (2013.01); *H01R 24/60* (2013.01); *H01R 12/716* (2013.01)

(58) Field of Classification Search
CPC .................. H01R 13/02; H01R 13/652; H01R 13/6582; H01R 13/6471; H01R 24/60
(Continued)

(56) References Cited

U.S. PATENT DOCUMENTS

RE39,380 E * 11/2006 Davis ..................... H01R 13/26
439/108
7,918,685 B1 * 4/2011 Kruckenberg ......... H01B 11/00
174/75 C
(Continued)

FOREIGN PATENT DOCUMENTS

CN 203386990 U 1/2014
CN 104022396 A 9/2014
(Continued)

*Primary Examiner* — Hae Moon Hyeon

(57) ABSTRACT

A female connector includes two terminal groups each having multiple terminals. The two terminal groups are spaced apart from each other. Contact sections of the terminals of each the two terminal groups are symmetrically disposed, and the two terminal groups have opposite terminal signal sequences. Each terminal group includes a plurality of power terminal pairs and a plurality of high-speed terminal pairs. The power terminal pair includes a power terminal and a power return ground terminal. The high-speed terminal pair includes two adjacent high-speed signal terminals. Cross-sectional areas of contact sections of the power terminal and the power return ground terminal are greater than a cross-sectional area of a contact section of the high-speed signal terminal.

20 Claims, 19 Drawing Sheets

(51) Int. Cl.
*H01R 13/6582* (2011.01)
*H01R 24/60* (2011.01)
*H01R 12/71* (2011.01)

(58) Field of Classification Search
USPC ............................................................ 439/92
See application file for complete search history.

(56) References Cited

U.S. PATENT DOCUMENTS

| | | | | |
|---|---|---|---|---|
| 9,780,492 | B1 | 10/2017 | Wang et al. | |
| 11,817,640 | B2 * | 11/2023 | Kim | H01R 13/6581 |
| 2008/0261448 | A1 * | 10/2008 | Yi | H01R 31/005 361/675 |
| 2015/0011104 | A1 * | 1/2015 | Lee | H01R 13/652 439/108 |

FOREIGN PATENT DOCUMENTS

| | | | |
|---|---|---|---|
| CN | 104022416 | A | 9/2014 |
| CN | 104577396 | A | 4/2015 |
| CN | 104752903 | A | 7/2015 |
| CN | 204668625 | U | 9/2015 |
| CN | 105990718 | A | 10/2016 |
| CN | 206461133 | U | 9/2017 |
| CN | 207282790 | U | 4/2018 |

* cited by examiner

CONNECTOR ASSEMBLY AND CABLE ASSEMBLY WITH HIGH-SPEED TERMINALS

CROSS-REFERENCE TO RELATED APPLICATIONS

This application is a national stage of International Application PCT/CN2022/072951, filed on Jan. 20, 2022, which claims priority to Chinese Patent Application No. 202110082751.2, filed on Jan. 21, 2021, and Chinese Patent application Ser. No. 202110229110.5, filed on Mar. 2, 2021. All the aforementioned priority applications are hereby incorporated by reference in their entirety.

TECHNICAL FIELD

This application relates to the field of connector technologies, and in particular, to a female connector, a male connector, a connector assembly, and a related product.

BACKGROUND

At present, a smart screen is a commonly used household appliance. People's requirements for the smart screen are not only reflected in ordinary film and television viewing, but also in enjoyment of high-definition vision and more diversified function requirements. To integrate an ultra-high-definition display function and other functions, the smart screen needs to have a high unidirectional transmission speed and a high supply power. Currently, a connector of the smart screen cannot meet the requirements.

SUMMARY

This application provides a female connector, a male connector, a connector assembly, a cable assembly, a device, and a communication system, to meet high power and high transmission rate requirements.

According to a first aspect, this application provides a female connector, including a first terminal group and a second terminal group. Each of the first terminal group and the second terminal group includes a plurality of terminals, each of the terminals includes a contact section, and the contact section is configured to electrically connect to a male connector. The first terminal group and the second terminal group are stacked and spaced apart from each other, a terminal signal sequence of the first terminal group is opposite to a terminal signal sequence of the second terminal group, and contact sections of a plurality of terminals of the first terminal group and contact sections of a plurality of terminals of the second terminal group are symmetrically disposed.

The first terminal group includes a plurality of power terminal pairs and a plurality of high-speed terminal pairs. The power terminal pair includes a power terminal and a power return ground terminal. The high-speed terminal pair includes two adjacent high-speed signal terminals. Cross-sectional areas of contact sections of the power terminal and the power return ground terminal are greater than a cross-sectional area of a contact section of the high-speed signal terminal.

In this application, the female connector improves a through-current capability by disposing the plurality of power terminal pairs, and improves a signal transmission rate by disposing the plurality of high-speed terminal pairs. In addition, the cross-sectional areas of the contact section of the power terminal and the contact section of the power return ground terminal are set to be larger than the cross-sectional area of the contact section of the high-speed signal terminal, so that the contact section of the power terminal and the contact section of the power return ground terminal have larger cross-sectional areas. Impedance of the power terminal and the power return ground terminal is small, and therefore a higher through-current capability is obtained. In addition, the contact section of the high-speed signal terminal keeps a small cross-sectional area, which not only avoids increasing an overall interface size of the female connector, but also helps to ensure that a high-speed signal has good high-frequency performance. Therefore, the female connector can improve the through-current capacity, and can maintain a small structural size and good high-frequency performance, to meet high power, small volume, and high transmission rate requirements.

In some possible implementations, in the first terminal group, the cross-sectional areas of the contact section of the power terminal and the contact section of the power return ground terminal may be greater than a cross-sectional area of a contact section of another terminal, to control the overall interface size while ensuring the through-current capability of the female connector, so that the female connector meets the small volume requirement at the same time.

In some possible implementations, the first terminal group further includes a plurality of isolated ground terminals, and adjacent terminals of the high-speed terminal pair include the isolated ground terminal. In this implementation, the isolated ground terminal is disposed beside the high-speed terminal pair, to ensure independent high-frequency performance of the differential pair. One of the two adjacent terminals of the high-speed terminal pair may be the isolated ground terminal, or both may be the isolated ground terminals.

In some possible implementations, the isolated ground terminal is disposed between the high-speed terminal pair and the power terminal. In this implementation, the isolated ground terminal is configured to prevent or reduce a magnetic field generated by a current of a power supply in the power terminal from interfering with the high-speed signal transmitted in the high-speed terminal pair.

In some possible implementations, at least one terminal is disposed between the power terminal and the isolated ground terminal, and a plurality of terminals are disposed between the power terminal and the power return ground terminal. In this implementation, large spacings are set between the power terminal and the isolated ground terminal, and between the power terminal and the power return ground terminal, to avoid corrosion and security problems caused by foreign matter or liquid inflow because positive and negative electrodes of the female connector are excessively close, and improve reliability of the female connector.

In some possible implementations, the first terminal group further includes a low-speed terminal pair, the low-speed terminal pair includes two adjacent low-speed signal terminals, and the isolated ground terminal is disposed between the low-speed terminal pair and the high-speed terminal pair. In this implementation, the isolated ground terminal is configured to isolate the high-speed signal terminal from the low-speed signal terminal, to reduce or avoid mutual interference between the high-speed signal and a low-speed signal.

In some possible implementations, the contact section of the power terminal and a contact section of an adjacent terminal form a first spacing, the contact section of the high-speed signal terminal and a contact section of an adjacent terminal form a second spacing, and the first spacing is greater than the second spacing.

In this implementation, the spacing between the contact section of the power terminal and the contact section of the adjacent terminal is large, so that a creepage distance between the power terminal and the adjacent terminal is large enough. In this way, a function failure of the female connector caused by a breakdown phenomenon due to a large voltage on the power terminal is avoided, so that reliability of the female connector is high. In addition, a high voltage does not need to be loaded on the high-speed signal terminal, and the spacing between the contact section of the high-speed signal terminal and the contact section of the adjacent terminal is small, which helps to make the interface size of the female connector small. Therefore, the female connector has high reliability and a small volume.

In some possible implementations, a quantity of terminals of the first terminal group is 22, and the terminal signal sequence of the first terminal group is: the power return ground terminal, the high-speed terminal pair, the isolated ground terminal, the high-speed terminal pair, the isolated ground terminal, a first terminal, the power terminal, a configuration terminal, the low-speed terminal pair, a second terminal, the power terminal, an auxiliary terminal, the isolated ground terminal, the high-speed terminal pair, the isolated ground terminal, the high-speed terminal pair, and the power return ground terminal.

The first terminal is configured to transmit a low-speed signal or is reserved. The configuration terminal is used for plugging detection, power supply negotiation, or interface configuration. The low-speed terminal pair includes two adjacent low-speed signal terminals. The second terminal is configured to transmit power or a low-speed signal or is reserved. The auxiliary terminal is used for high-speed link initialization, HDCP handshake, capability obtaining, or audio backhaul.

In some possible implementations, the female connector further includes an insulating body and a metal housing. The insulating body includes a base body and a tongue plate. The tongue plate is fastened to one side of the base body, the metal housing surrounds the tongue plate and is fixedly connected to the insulating body, and a plugging space is formed between the metal housing and the tongue plate.

Each terminal further includes a connection section, and the connection section of the terminal is connected to one end of the contact section. The connection section of each terminal is embedded in the base body, and the contact section of each terminal is fastened to the tongue plate. In addition, the contact sections of the terminals of the first terminal group and the contact sections of the terminals of the second terminal group are respectively exposed on two sides of the tongue plate.

In this implementation, because the metal housing is disposed around the tongue plate, the first terminal group, and the second terminal group, the female connector can implement a good electromagnetic interference function and an electromagnetic compatibility function by using the metal housing.

In some possible implementations, each terminal further includes a tail section, the tail section of the terminal is connected to an end that is of the connection section and that is away from the contact section, and the tail section is exposed relative to the insulating body. Cross-sectional areas of connection sections of the power terminal and the power return ground terminal are greater than a cross-sectional area of a connection section of the high-speed signal terminal, and cross-sectional areas of tail sections of the power terminal and the power return ground terminal are greater than a cross-sectional area of a tail section of the high-speed signal terminal. In this case, the female connector can better meet the high power and high transmission rate requirements.

In some possible implementations, the female connector further includes a ground plate, and the ground plate is embedded in the insulating body. The ground plate is located between the first terminal group and the second terminal group, and is configured to provide a shielding function, to suppress signal crosstalk between the first terminal group and the second terminal group.

In some possible implementations, the metal housing includes a first plate body and a second plate body that are disposed oppositely. The first plate body faces the first terminal group, and the second plate body faces the second terminal group. The metal housing further includes a first spring plate and a second spring plate. One end of the first spring plate is connected to the first plate body, and the other end of the first spring plate is bent inward and suspended. One end of the second spring plate is connected to the second plate body, and the other end of the second spring plate is bent inward and suspended.

In this implementation, free ends of the first spring plate and the second spring plate abut against the male connector, and the free ends are easily displaced by force, so that the male connector is easily plugged into the female connector. In addition, the free ends are easily reset after the male connector is pulled out, so that reliability of the metal housing and the female connector is high.

In some possible implementations, the metal housing further includes a first protective boss and a second protective boss. The first protective boss is protruded on an inner wall of the first plate body, and a height of the first protective boss is less than a height of the first spring plate. The second protective boss is protruded on an inner wall of the second plate body, and a height of the second protective boss is less than a height of the second spring plate.

The first protective boss can prevent the male connector from directly contacting the inner wall of the first plate body, so that a gap between the male connector and the inner wall of the first plate body is always maintained, thereby avoiding an overvoltage phenomenon on the first spring plate, so as to improve reliability of the metal housing and the female connector. Similarly, the second protective boss can prevent the male connector from directly contacting the inner wall of the second plate body, so that a gap between the male connector and the inner wall of the second plate body is always maintained, thereby avoiding an overvoltage phenomenon on the second spring plate, so as to improve reliability of the metal housing and the female connector.

In some possible implementations, the metal housing includes a first plate body and a second plate body that are disposed oppositely. The first plate body faces the first terminal group, and the second plate body faces the second terminal group. The metal housing further includes a first protective boss, a second protective boss, a first spring plate and a second spring plate. The first protective boss is protruded on an inner wall of the first plate body, one end of the first spring plate is connected to the first protective boss, and the other end of the first spring plate is bent inward and suspended. The second protective boss is protruded on an inner wall of the second plate body, one end of the second spring plate is connected to the second protective boss, and the other end of the second spring plate is bent inward and suspended.

In this implementation, free ends of the first spring plate and the second spring plate abut against the male connector, and the free ends are easily displaced by force, so that the male connector is easily plugged into the female connector. In addition, the free ends are easily reset after the male connector is pulled out, so that reliability of the metal housing and the female connector is high. The first protective boss can prevent the male connector from directly contacting the inner wall of the first plate body, so that a gap between the male connector and the inner wall of the first plate body is always maintained, thereby avoiding an overvoltage phenomenon on the first spring plate, so as to improve reliability of the metal housing and the female connector. Similarly, the second protective boss can prevent the male connector from directly contacting the inner wall of the second plate body, so that a gap between the male connector and the inner wall of the second plate body is always maintained, thereby avoiding an overvoltage phenomenon on the second spring plate, so as to improve reliability of the metal housing and the female connector.

In some possible implementations, the first spring plate, the first protective boss, and the first plate body are integrally formed structural parts.

In some possible implementations, the female connector further includes a metal casing. The metal casing is sleeved on an outer side of the metal housing, the metal casing is fixedly and electrically connected to the metal housing, and the metal casing is a complete sleeve structure. The metal casing is a pumping housing with a complete structure, and a through-hole structure that may cause water inlet and dust inlet is not disposed on the metal casing, to meet a sealing requirement.

In this implementation, cooperation between the metal housing and the metal casing makes the female connector balance an EMI function and a waterproof function, to have better reliability. In this implementation, the female connector can reach an IPX8 waterproof level by using the foregoing structures.

In some possible implementations, the female connector further includes a metal ferrule. The metal ferrule surrounds the base body and is fixedly connected to the base body, the metal ferrule is located on an inner side of the metal casing, and the metal ferrule is fixedly connected to the metal casing. The metal casing and the metal housing may be designed in structural dimensions, so that there is specific magnitude of interference between the metal casing and the metal housing. After the metal casing and the metal housing are assembled, the metal casing may be further pressed up and down, so that interference fit between the metal casing and the first plate body and the second plate body is more reliable. In addition, the metal casing and the metal housing may be fastened to each other through laser welding. Certainly, the metal casing and the metal housing may alternatively be fastened and electrically connected to each other in another manner. This is not strictly limited in this application.

The metal casing is connected to both the metal housing and the metal ferrule, and the metal ferrule is fastened to the base body. Therefore, both the metal casing and the metal housing are fixed relative to the base body. The metal ferrule may be fixedly connected to the base body through bonding, integral molding, clamping, or the like. The metal casing may be fixedly connected to the metal ferrule and the metal housing through laser welding.

In some possible implementations, the female connector further includes a metal cover. The metal cover is fixedly connected to the metal casing and the base body, and surrounds a part of the metal casing and a part of the base body. The metal cover may be fixedly connected to the metal casing through laser welding or the like. The metal cover may further be fixedly connected to the base body through clamping or the like. The metal cover may be electrically connected to the metal casing.

In some possible implementations, the female connector further includes a sealing ring. The sealing ring surrounds the outer side of the metal housing and is disposed close to an opening of the plugging space. The sealing ring is continuously connected to an end peripheral edge of the metal housing and an end peripheral edge of the metal casing, to seal a gap between the metal housing and the metal casing, thereby improving waterproof performance of the female connector. In addition, disposing of the sealing ring makes an appearance of the female connector more smooth, thereby improving appearance experience.

In some possible implementations, the metal housing further includes a guide plate. The guide plate is connected to the first plate body, a third plate body, the second plate body, and a fourth plate body of the metal housing, and is configured to guide the male connector to be smoothly plugged into the plugging space. The guide plate may be a continuous structure, or may include a plurality of parts that are independent of each other.

According to a second aspect, this application further provides a male connector, including a third terminal group and a fourth terminal group. Each of the third terminal group and the fourth terminal group includes a plurality of terminals, and each of the terminals includes an abutting section. The third terminal group and the fourth terminal group are stacked and spaced apart from each other, a terminal signal sequence of the third terminal group is opposite to a terminal signal sequence of the fourth terminal group, and abutting sections of a plurality of terminals of the third terminal group and abutting sections of a plurality of terminals of the fourth terminal group are symmetrically disposed.

The third terminal group includes a plurality of power terminal pairs and a plurality of high-speed terminal pairs. The power terminal pair includes a power terminal and a power return ground terminal. The high-speed terminal pair includes two adjacent high-speed signal terminals. Cross-sectional areas of contact sections of the power terminal and the power return ground terminal are greater than a cross-sectional area of a contact section of the high-speed signal terminal.

In this implementation, the male connector improves a through-current capability by disposing the plurality of power terminal pairs, and improves a signal transmission rate by disposing the plurality of high-speed terminal pairs. In addition, the cross-sectional areas of the abutting sections of the power terminal and the power return ground terminal are set to be larger than the cross-sectional area of the abutting section of the high-speed signal terminal, so that the abutting sections of the power terminal and the power return ground terminal have larger cross-sectional areas. Impedance of the power terminal and the power return ground terminal is small, and therefore a higher through-current capability is obtained. In addition, the high-speed signal terminal keeps a small cross-sectional area, which not only avoids increasing an overall interface size of the male connector, but also helps to ensure that a high-speed signal has good high-frequency performance. Therefore, the male connector can improve the through-current capacity, and can maintain a small structural size and good high-frequency performance, to meet high power, small volume, and high transmission rate requirements.

In some possible implementations, the third terminal group further includes a plurality of isolated ground terminals, and adjacent terminals of the high-speed terminal pair include the isolated ground terminal. In this implementation, the isolated ground terminal is disposed beside the high-speed terminal pair, to ensure independent high-frequency performance of the differential pair.

In some possible implementations, the isolated ground terminal is disposed between the high-speed terminal pair and the power terminal. In this case, the isolated ground terminal is configured to prevent or reduce a magnetic field generated by a current of a power supply in the power terminal from interfering with the high-speed signal transmitted in the high-speed terminal pair.

In some possible implementations, at least one terminal is disposed between the power terminal and the isolated ground terminal, and a plurality of terminals are disposed between the power terminal and the power return ground terminal. In this implementation, large spacings are set between the power terminal and the isolated ground terminal, and between the power terminal and the power return ground terminal, to avoid corrosion and security problems caused by foreign matter or liquid inflow because positive and negative electrodes of the male connector are excessively close, and improve reliability of the male connector.

In some possible implementations, the third terminal group further includes a low-speed terminal pair, the low-speed terminal pair includes two adjacent low-speed signal terminals, and the isolated ground terminal is disposed between the low-speed terminal pair and the high-speed terminal pair. The isolated ground terminal is configured to isolate the low-speed terminal pair from the high-speed terminal pair, to reduce or avoid mutual interference between the high-speed signal and a low-speed signal.

In some possible implementations, the abutting section of the power terminal and an abutting section of an adjacent terminal form a first spacing, the abutting section of the high-speed signal terminal and an abutting section of an adjacent terminal form a second spacing, and the first spacing is greater than the second spacing.

In this implementation, the spacing between the abutting section of the power terminal and the abutting section of the adjacent terminal is large, so that a creepage distance between the power terminal and the adjacent terminal is large enough. In this way, a function failure of the male connector caused by a breakdown phenomenon due to a large voltage on the power terminal is avoided, so that reliability of the male connector is high. In addition, a high voltage does not need to be loaded on the high-speed signal terminal, and the spacing between the abutting section of the high-speed signal terminal and the abutting section of the adjacent terminal is small, which helps to make the interface size of the male connector small. Therefore, the male connector has high reliability and a small volume.

In some possible implementations, a quantity of terminals of the third terminal group is 22, and the terminal signal sequence of the third terminal group is: the power return ground terminal, the high-speed terminal pair, the isolated ground terminal, the high-speed terminal pair, the isolated ground terminal, a first terminal, the power terminal, a configuration terminal, the low-speed terminal pair, a second terminal, the power terminal, an auxiliary terminal, the isolated ground terminal, the high-speed terminal pair, the isolated ground terminal, the high-speed terminal pair, and the power return ground terminal.

The first terminal is configured to transmit a low-speed signal or is reserved. The configuration terminal is used for plugging detection, power supply negotiation, or interface configuration. The low-speed terminal pair includes two adjacent low-speed signal terminals. The second terminal is configured to transmit power or a low-speed signal or is reserved. The auxiliary terminal is used for high-speed link initialization, HDCP handshake, capability obtaining, or audio backhaul.

In some possible implementations, a height of the abutting section of the power terminal is less than a height of the abutting section of the high-speed signal terminal, and a height of the abutting section of the power return ground terminal is less than the height of the abutting section of the high-speed signal terminal.

In some possible implementations, the abutting section of the power terminal is provided with a cutting seam, and the cutting seam extends to an end of the abutting section of the power terminal.

In some possible implementations, the male connector further includes an insulating support, an insulating housing, and a metal shell. Both the third terminal group and the fourth terminal group are fastened to the insulating support. The insulating housing surrounds the insulating support and is fixedly connected to the insulating support. A movement space is formed inside the insulating housing. The abutting sections of the terminals of the third terminal group and the abutting sections of the terminals of the fourth terminal group are located in the movement space, and the metal shell surrounds the insulating housing and is fixedly connected to the insulating housing.

The metal shell may be a complete sleeve structure, so that the male connector can balance an EMI function and a waterproof function, to have better reliability. In this implementation, the male connector can reach an IPX8 waterproof level by using the foregoing structures.

In some possible implementations, the male connector further includes a ground plate, and the ground plate is fastened to the insulating support. The ground plate is located between the third terminal group and the fourth terminal group, and is configured to provide a shielding function, to suppress signal crosstalk between the third terminal group and the fourth terminal group.

Two sides of the ground plate may be exposed relative to the insulating support, and may be exposed relative to the insulating housing. Two sides of the metal shell may be connected to the ground plate through laser welding or the like, to implement grounding.

According to a third aspect, this application further provides a connector assembly, including the female connector according to any one of the foregoing implementations or the male connector according to any one of the foregoing implementations.

According to a fourth aspect, this application further provides a cable assembly, including the female connector according to any one of the foregoing implementations or the male connector according to any one of the foregoing implementations. The cable assembly further includes a cable, and the cable is electrically connected to the female connector or the male connector.

According to a fifth aspect, this application further provides a device, including the female connector according to any one of the foregoing implementations or the male connector according to any one of the foregoing implementations.

According to a sixth aspect, this application further provides a communication system, including a device and a cable assembly. The device includes the female connector according to any one of the foregoing implementations. The cable assembly includes a cable and the male connector that is electrically connected to the cable according to any one of the foregoing implementations. The male connector is plugged into the female connector.

DESCRIPTION OF EMBODIMENTS

The following describes technical solutions of embodiments in this application with reference to accompanying drawings.

In the descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

Terms such as "first" and "second" mentioned below are merely intended for a purpose of description, and shall not be understood as implication or implication of relative importance or implicit indication of a quantity of indicated technical features. Therefore, a feature limited by "first" or "second" may explicitly or implicitly include one or more features.

Orientation terms mentioned in embodiments of this application, for example, "upper", "lower", "inside", "outside", "side face", "top", and "bottom", are merely directions in which reference is made to the accompanying drawings. The used orientation terms are intended to better and more clearly describe and understand embodiments of this application, instead of indicating or implying that the apparatus or element need have a specific orientation, be constructed in a specific orientation, and operate in a specific orientation. Therefore, the used orientation terms cannot be construed as a limitation on embodiments of this application.

In the description of embodiments of this application, it should be noted that, unless otherwise explicitly specified and limited, terms "mounted", "connected", "connection", and "disposed on . . . " should be understood in a broad sense. For example, "connection" may be a detachable connection or a non-detachable connection; may be a direct connection or an indirect connection through an intermediate medium.

Figure 1:
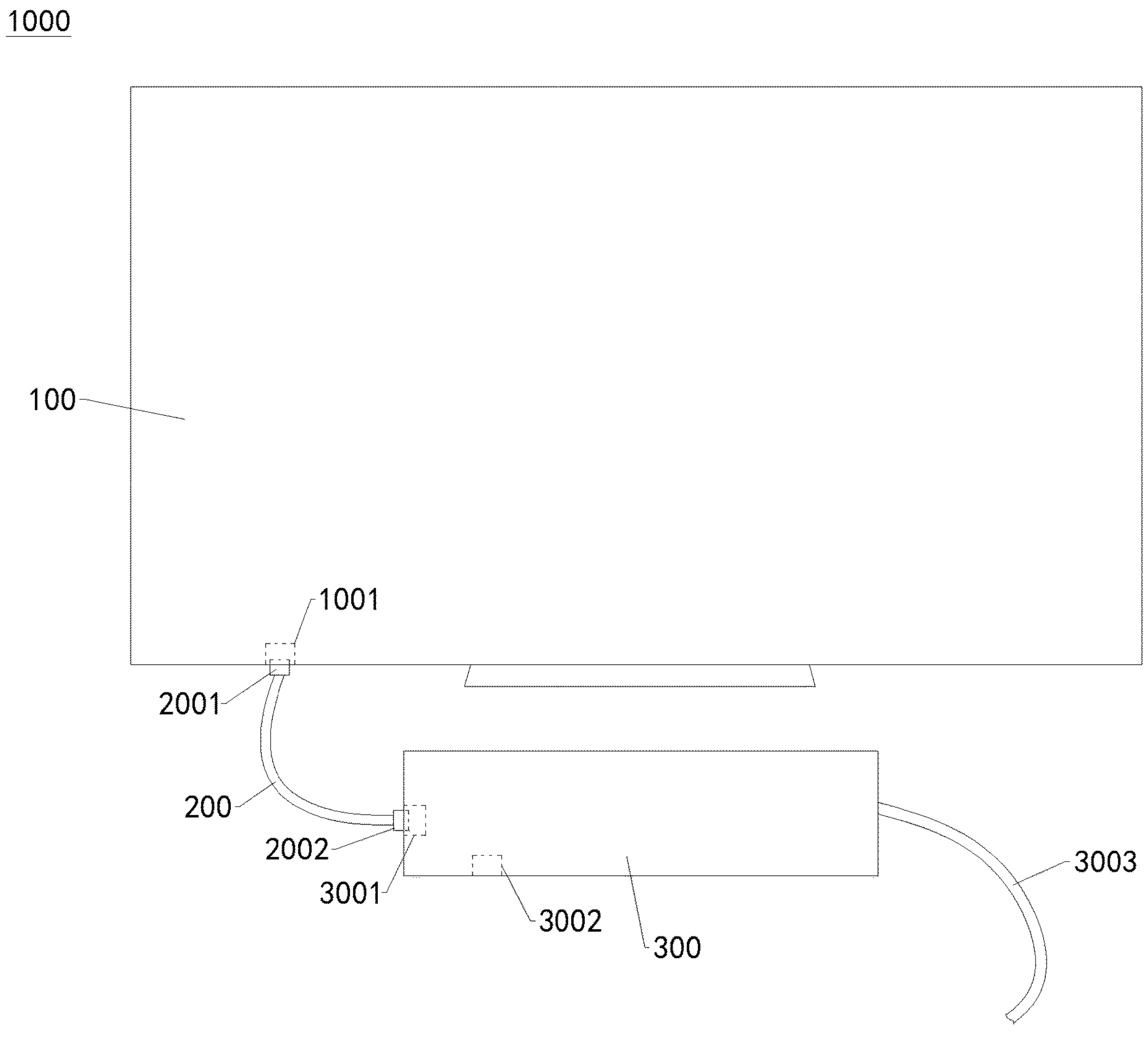
FIG. 1 is a schematic diagram of a communication system according to an embodiment of this application.

FIG. 1 is a schematic diagram of a communication system 1000 according to an embodiment of this application.

The communication system 1000 includes a first device 100, a cable assembly 200, and a second device 300. The cable assembly 200 is connected between the first device 100 and the second device 300. It should be noted that FIG. 1 and the following related accompanying drawings schematically show only some components included in the communication system 1000, and actual shapes, actual sizes, actual locations, and actual structures of these components are not limited by FIG. 1 and the following accompanying drawings.

For example, the first device 100 may be a set-top box (also referred to as a digital video converter box, set-top box, STB), a computer host, a projector, an interactive personality television (internet protocol television, IPTV) box, or a network set-top box (over the top, OTT). The second device 300 may be a display device, such as a screen, a tablet personal computer (tablet personal computer), a laptop computer (laptop computer), a personal computer, a notebook computer, a vehicle-mounted device, a wearable device, augmented reality (augmented reality, AR) glasses, an AR helmet, virtual reality (virtual reality, VR) glasses, or a VR helmet.

In some embodiments, the first device 100 is a smart screen, and the second device 300 is a set-top box. The cable assembly 200 is connected between the smart screen and the set-top box. When the set-top box is powered on, the set-top box may transmit power to the smart screen through the cable assembly 200, so that the screen is powered on. In this way, the screen may be directly electrically connected to an external power supply without a component such as a plug or a connector, and the screen can eliminate a component electrically connected to the external power supply, thereby simplifying a structure of the screen, and avoiding an increase in a thickness of the screen caused by the component electrically connected to the external power supply, in other words, this helps to realize a thinning setting of the screen.

In some embodiments, the first device 100 is a computer display screen, and the second device 300 is a computer host. For example, the computer display screen may be placed on a desktop. The cable assembly 200 is connected between the computer host and the computer display screen. When the computer host is powered on, the computer host may transmit power to the computer display screen through the cable assembly 200, so that the computer display screen is powered on. In this way, the computer display screen may be directly electrically connected to an external power supply without a component such as a plug or a connector, and the computer display screen can eliminate a component connected to the external power supply, thereby simplifying a structure of the computer display screen, and avoiding an increase in a thickness of the computer display screen caused by the component connected to the external power supply, in other words, this helps to realize a thinning setting of the computer display screen.

In other embodiments, the first device 100 is VR glasses, and the second device 300 is a computer host. The cable assembly 200 is connected between the computer host and the VR glasses. Because the computer host can transmit a high-speed signal to the VR glasses through the cable assembly 200, the VR glasses can present a high-definition and smooth virtual scene, and user experience is high. Therefore, the cable assembly 200 is also a good choice in the application field of VR.

As shown in FIG. 1, an example in which the first device 100 is a smart screen and the second device 300 is a set-top box is used for description. In some embodiments, the communication system 1000 is a video communication system that includes a smart screen 100, the cable assembly 200, and a set-top box 300. For example, the smart screen 100 includes a female connector 1001, the set-top box 300 includes a female connector 3001, and two male connectors (2001, 2002) are respectively disposed on two ends of the cable assembly 200. The male connector 2001 may be plugged into the female connector 1001 of the smart screen 100, and the male connector 2002 may be plugged into the female connector 3001 of the set-top box 300, so that the cable assembly 200 is electrically connected to the smart screen 100 and the set-top box 300. Mated female connector and male connector form a connector assembly. In this application, to enable the smart screen 100 to meet high-definition playing and multi-functional requirements, a power of the connector assembly may be greater than or equal to 300 W, and a transmission rate may be greater than or equal to 80 Gbps, to implement high power and high-speed transmission performance.

In a conventional video playing system, a connector of a connector assembly usually uses a USB type-C (universal serial bus type-C, universal serial bus type-C) interface structure or an HDMI (high-definition multimedia interface, high-definition multimedia interface) structure. A USB type-C interface is a standard interface formulated by the USB-IF (USB implementers forum, USB standardization association). Generally, an upper limit of a through-current capability of the USB type-C interface is 10 A, and an upper limit of a unidirectional transmission capability of the USB type-C interface is 40 Gbps (1000 megabits per second). Because performance of the USB type-C interface is limited by a structure specified by the association, the upper limit of the through-current capability and the upper limit of the unidirectional transmission capability are difficult to be broken, and high power and high-speed transmission requirements of the video playing system cannot be met. An HDMI is a standard interface defined by the HDMI Association. Currently, a maximum transmission rate is 48 Gbps and there is no power supply capability. Due to fixed limitations of the structure and an interface of the HDMI, a transmission rate of the HDMI cannot exceed 48 Gbps to achieve a higher transmission rate, and the power supply capability cannot be obtained. Therefore, the HDMI cannot meet the high power and high-speed transmission requirements of the video playing system. Based on this, this application provides a new connector assembly. A female connector and a male connector of the connector assembly use a new interface design and a new structure design, to meet high power and high-speed transmission requirements.

Figure 2:
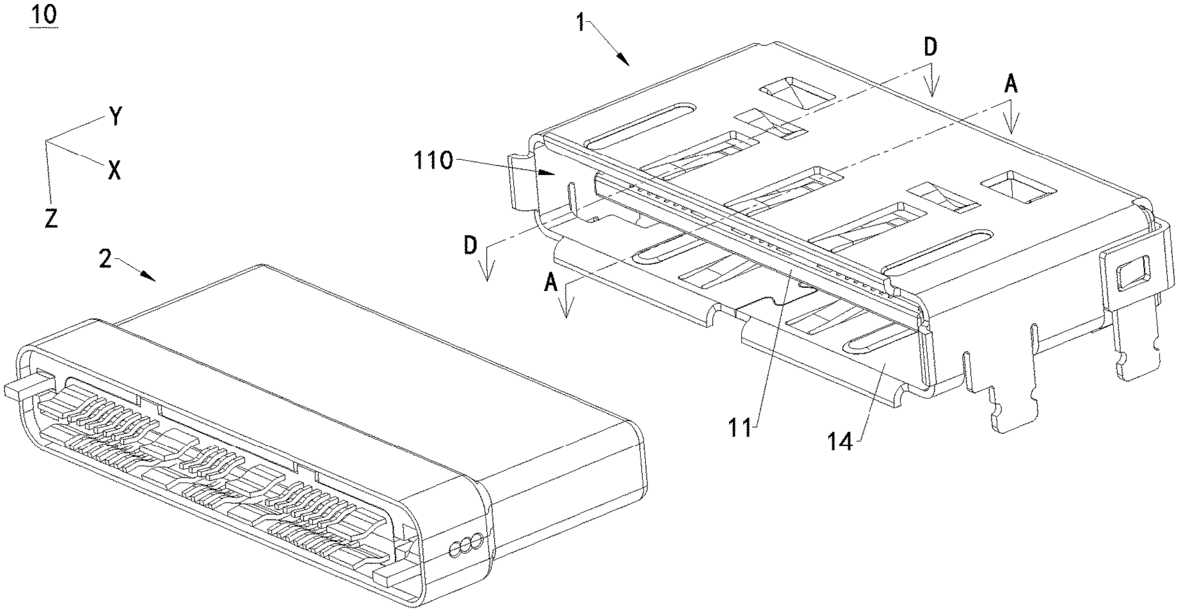
FIG. 2 is a schematic diagram of an exploded structure of a connector assembly according to an embodiment of this application.
Figure 3:
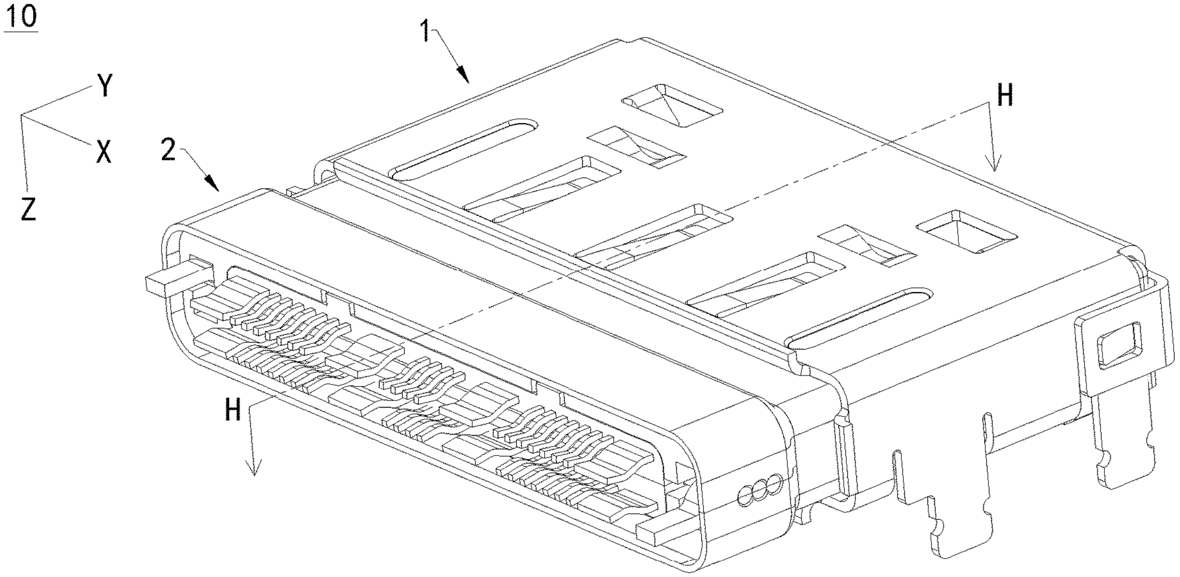
FIG. 3 is a schematic diagram of an assembly structure of the connector assembly shown in FIG. 2.

Refer to FIG. 2 and FIG. 3. FIG. 2 is a schematic diagram of an exploded structure of a connector assembly 10 according to an embodiment of this application. FIG. 3 is a schematic diagram of an assembly structure of the connector assembly 10 shown in FIG. 2. The connector assembly 10 may be used in the communication system 1000 shown in FIG. 1.

In some embodiments, the connector assembly 10 includes a female connector 1 and a male connector 2, and the male connector 2 can be detachably plugged into the female connector 1. The female connector 1 has a plugging space 110, and the male connector 2 may be partially plugged into the plugging space 110, to be structurally connected and electrically connected to the male connector 2.

For ease of subsequent description, a first direction X, a second direction Y, and a third direction Z are defined in this embodiment of this application. The second direction Y is perpendicular to the first direction X, and the third direction Z is perpendicular to the first direction X and the second direction Y. Length directions of the connector assembly 10, the female connector 1, and the male connector 2 are parallel to the first direction X, width directions of the connector assembly 10, the female connector 1, and the male connector 2 are parallel to the second direction Y, and thickness directions of the connector assembly 10, the female connector 1, and the male connector 2 are parallel to the third direction Z. A plugging direction of the male connector 2 and the female connector 1 is parallel to the second direction Y.

Figure 4:
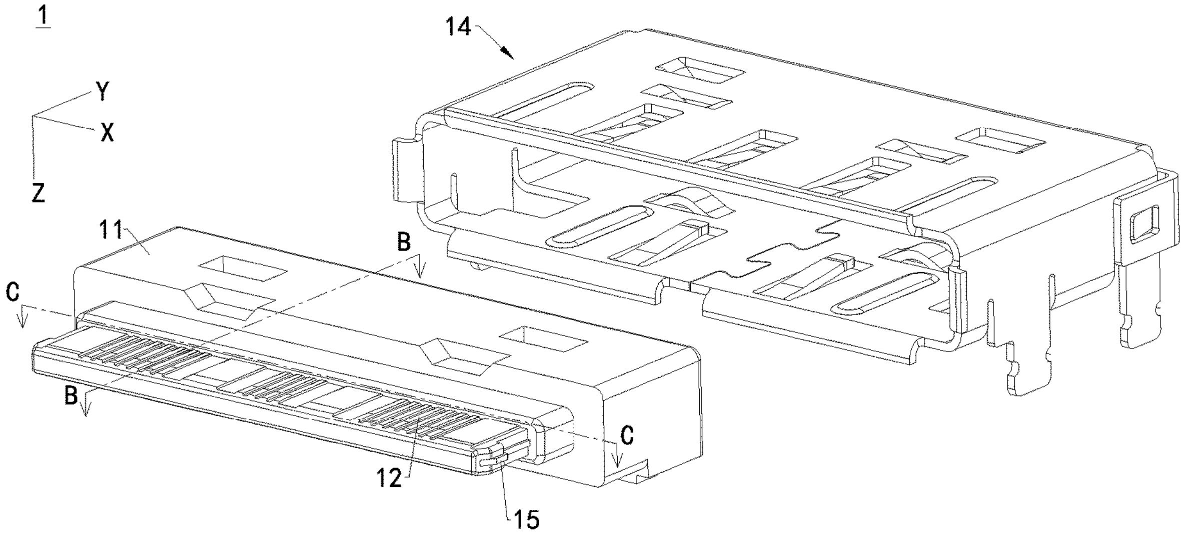
FIG. 4 is a schematic diagram of a partial exploded structure of a female connector shown in FIG. 2.
Figure 5:
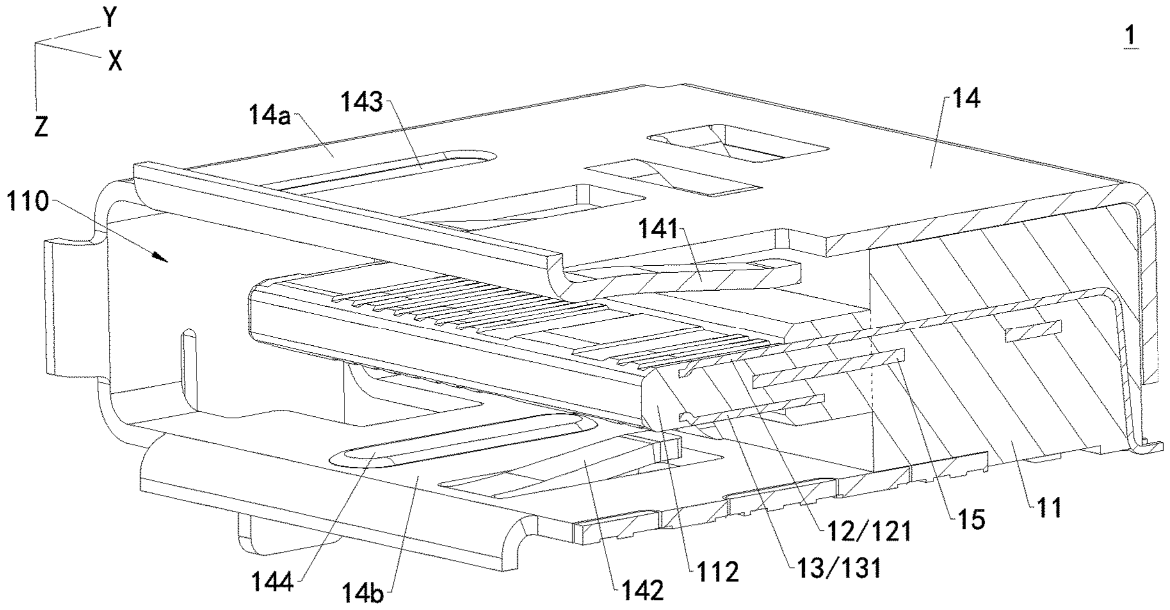
FIG. 5 is a schematic diagram of a cross-sectional structure of the connector assembly shown in FIG. 2 cut along A-A.

Refer to FIG. 2, FIG. 4, and FIG. 5. FIG. 4 is a schematic diagram of a partial exploded structure of the female connector 1 shown in FIG. 2. FIG. 5 is a schematic diagram of a cross-sectional structure of the connector assembly 10 shown in FIG. 2 cut along A-A.

In some embodiments, the female connector 1 includes an insulating body 11, a first terminal group 12, a second terminal group 13, and a metal housing 14. Both the first terminal group 12 and the second terminal group 13 are fastened to the insulating body 11. The metal housing 14 is disposed around the insulating body 11 and is fixedly connected to the insulating body 11. That is, the insulating body 11 is mounted on an inner side of the metal housing 14. The metal housing 14 and the insulating body 11 jointly form the plugging space 110, and the first terminal group 12 and the second terminal group 13 are partially exposed in the plugging space 110.

Figure 6A:
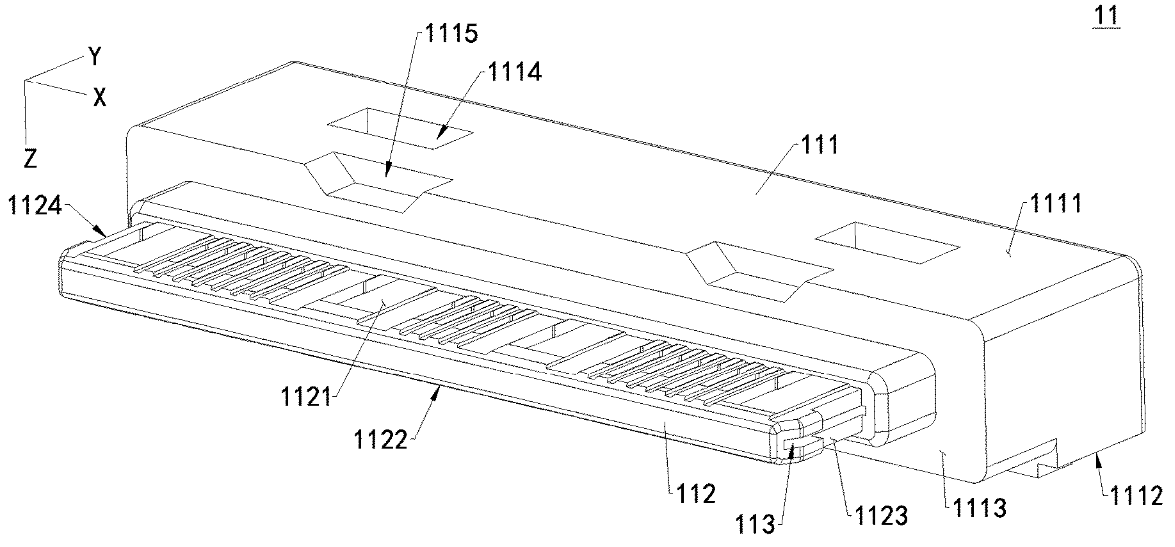
FIG. 6A is a schematic diagram of a structure of an insulating body of the female connector shown in FIG. 4.

FIG. 6A is a schematic diagram of a structure of the insulating body 11 of the female connector 1 shown in FIG. 4.

In some embodiments, the insulating body 11 includes a base body 111 and a tongue plate 112. The base body 111 may be substantially in a shape of a strip and extend along the first direction X. The base body 111 includes a top surface 1111 and a bottom surface 1112 that are disposed opposite to each other, and a side surface 1113 that is located between the top surface 1111 and the bottom surface 1112. For example, at least one first groove 1114, at least one second groove 1115, and at least one third groove may be disposed on the base body 111. An opening of the first groove 1114 and an opening of the second groove 1115 are both located on the top surface 1111 of the base body 111. The second groove 1115 further penetrates through the side surface 1113 of the base body 111, and an opening of the third groove is located on the bottom surface 1112 of the base body 111 and penetrates through the side surface 1113 of the base body 111. The tongue plate 112 may be substantially in a shape of a strip and extend along the first direction X. The tongue plate 112 is fastened to one side of the base body 111. For example, the tongue plate 112 is protruded on the side surface 1113 of the base body 111, and the tongue plate 112 and the base body 111 are arranged in the second direction Y. The tongue plate 112 and the base body 111 may be integrally formed structural parts. The tongue plate 112 includes a top surface 1121 and a bottom surface 1122 that are disposed opposite to each other, and further includes a first side surface 1123 and a second side surface 1124 that are located between the top surface 1121 and the bottom surface 1122. The first side surface 1123 and the second side surface 1124 are arranged in the first direction X.

Figure 6B:
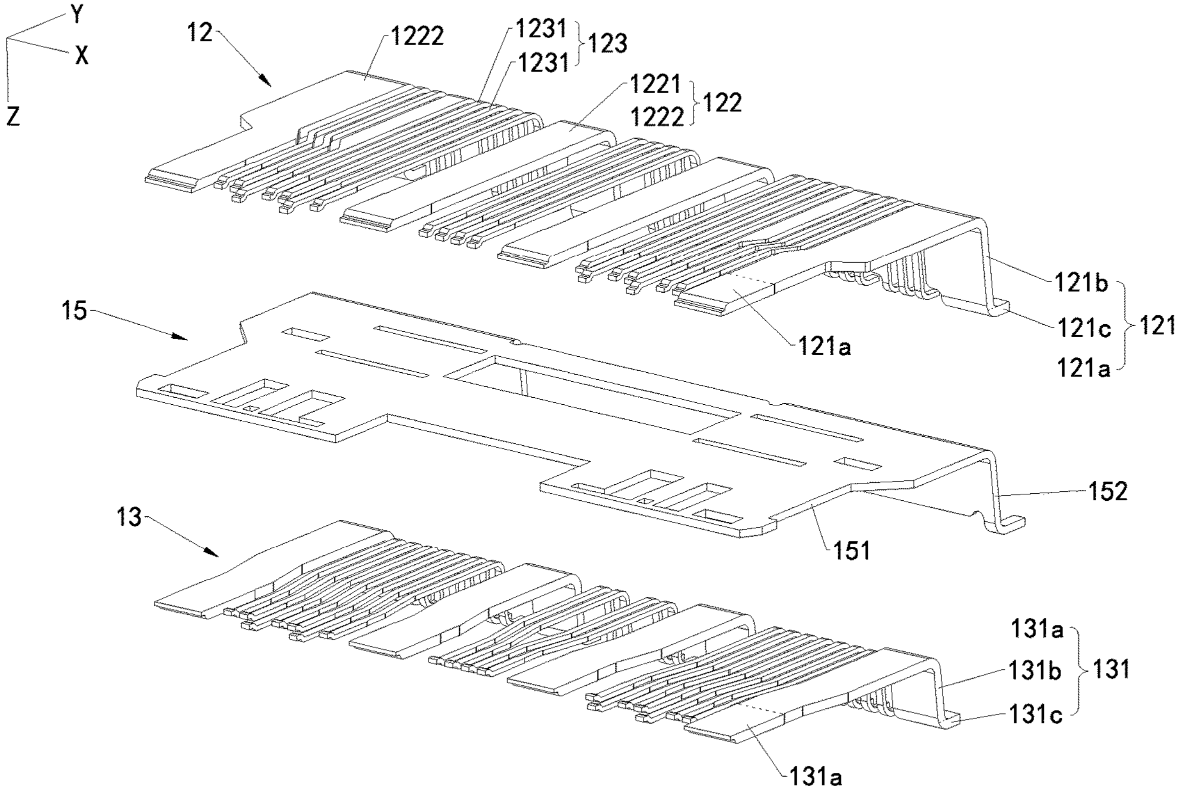
FIG. 6B is a schematic diagram of a structure of a partial structure of the female connector shown in FIG. 4.

FIG. 6B is a schematic diagram of a structure of a partial structure of the female connector 1 shown in FIG. 4.

In some embodiments, the first terminal group 12 includes a plurality of terminals 121, and the plurality of terminals 121 are arranged at spacings in the first direction X. Each terminal 121 includes a contact section 121*a*, a connection section 121*b* and a tail section 121*c*. The connection section 121*b* is connected to one end of the contact section 121*a*. The tail section 121*c* is connected to one end that is of the connection section 121*b* and that is away from the contact section 121*a*, in other words, the connection section 121*b* is connected between the contact section 121*a* and the tail section 121*c*. The contact section 121*a* of each terminal 121 extends along the second direction Y. The connection section 121*b* of the terminal 121 includes a first portion and a second portion. The first portion is connected between the contact section 121*a* and the second portion. The first portion extends along the second direction Y (the portion is allowed to be offset), and the second portion is bent relative to the first portion. The tail section 121*c* of each terminal 121 is bent relative to the second portion of the connection section 121*b*. The first terminal group 12 includes at least two terminal structures, and a main difference between the two terminal structures lies in different cross-sectional areas of terminals 121. In this embodiment of this application, a cross-sectional area of a structure is a cross-sectional area of the structure in a plane perpendicular to an extension direction of the structure.

In some embodiments, the second terminal group 13 includes a plurality of terminals 131, and the plurality of terminals 131 are arranged at spacings in the first direction X. Each terminal 131 includes a contact section 131*a*, a connection section 131*b* and a tail section 131*c*. The connection section 131*b* is connected to one end of the contact section 131*a*. The tail section 131*c* is connected to one end that is of the connection section 131*b* and that is away from the contact section 131*a*, in other words, the connection section 131*b* is connected between the contact section 131*a* and the tail section 131*c*. The contact section 131*a* of each terminal 131 extends along the second direction Y. Connection sections 131*b* of some terminals 131 extend as a whole along the second direction Y. The connection section 131*b* of the terminal 131 includes a first portion and a second portion. The first portion is connected between the contact section 131*a* and the second portion. The first portion extends along the second direction Y (the portion is allowed to be offset), and the second portion is bent relative to the first portion. The tail section 131*c* of each terminal 131 is bent relative to the second portion of the connection section 131*b*. The second terminal group 13 includes at least two terminal 131 structures, and a main difference between the two terminal 131 structures lies in different cross-sectional areas of terminals 131.

In some embodiments, the female connector 1 further includes a ground plate 15. The ground plate 15 includes a first portion 151 and a second portion 152, the second portion 152 is bent relative to the first portion 151, and a pin is formed at an end of the second portion 152.

Figure 7:
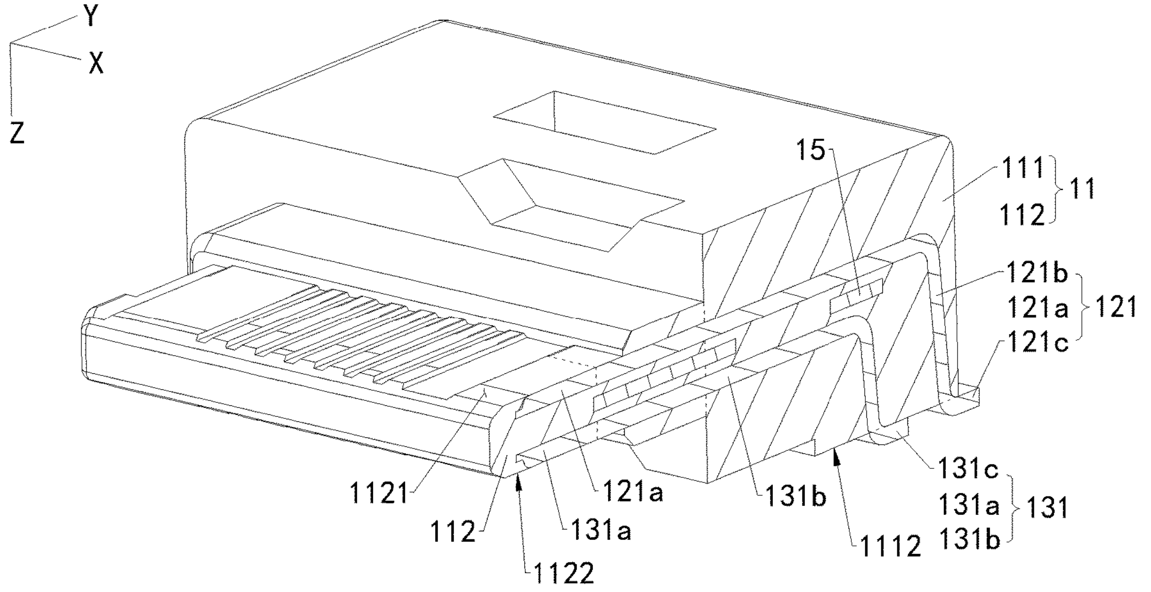
FIG. 7 is a schematic diagram of a cross-sectional structure of a partial structure of the female connector shown in FIG. 4 cut along B-B.

Refer to FIG. 6A, FIG. 6B, and FIG. 7. FIG. 7 is a schematic diagram of a cross-sectional structure of a partial structure of the female connector 1 shown in FIG. 4 cut along B-B.

In some embodiments, the first terminal group 12 and the second terminal group 13 are stacked and spaced apart from each other. A gap is formed between the first terminal group 12 and the second terminal group 13, and the two are not in contact. The connection section 121*b* of the terminal 121 of the first terminal group 12 is embedded in the base body 111, and the connection section 131*b* of the terminal 131 of the second terminal group 13 is embedded in the base body 111, so that the terminals (121, 131) are fastened to the insulating body 11. One end of the connection section 121*b* of the terminal 121 may extend to the tongue plate 112, and one end of the connection section 131*b* of the terminal 131 may extend to the tongue plate 112. The contact section 121*a* of the terminal 121 of the first terminal group 12 is fastened to the tongue plate 112, and the contact section 131*a* of the terminal 131 of the second terminal group 13 is fastened to the tongue plate 112. In addition, the contact section 121*a* of the terminal 121 of the first terminal group 12 and the contact section 131*a* of the terminal 131 of the second terminal group 13 are respectively exposed on both sides of the tongue plate 112. For example, the contact section 121*a* of the terminal 121 of the first terminal group 12 is exposed on the top surface 1121 of the tongue plate 112, and the contact section 131*a* of the terminal 131 of the second terminal group 13 is exposed on the bottom surface 1122 of the tongue plate 112. For example, the terminal 121 of the first terminal group 12 and the terminal 131 of the second terminal group 13 may be at least partially embedded in the tongue plate 112, so that a connection structure between the terminals (121, 131) and the tongue plate 112 is more stable and reliable. The tail section 121*c* of the terminal 121 of the first terminal group 12 and the tail section 131*c* of the terminal 131 of the second terminal group 13 are exposed relative to the insulating body 11, for example, exposed relative to the bottom surface 1112 of the base body 111.

In some embodiments, as shown in FIG. 6A, an installation space 113 is disposed inside the insulating body 11, and the installation space 113 extends from the tongue plate 112 to the base body 111. The installation space 113 may further penetrate from the first side surface 1123 to the second side surface 1124 of the tongue plate 112. Refer to FIG. 4 and FIG. 6A. The ground plate 15 is located in the installation space 113, to be embedded in the insulating body 11. A partial structure of the ground plate 15 may protrude relative to the first side surface 1123 and the second side surface 1124. As shown in FIG. 7, the ground plate 15 is located between the first terminal group 12 and the second terminal group 13, and is configured to provide a shielding function, to suppress signal crosstalk between the first terminal group 12 and the second terminal group 13. The insulating body 11, the first terminal group 12, the second terminal group 13, and the ground plate 15 may be formed into an integrated structure through an insert-molding (insert-molding) process, in other words, integrally formed structural parts.

Refer to FIG. 5 and FIG. 7. In some embodiments, the metal housing 14 surrounds the tongue plate 112, and the plugging space 110 is formed between the metal housing 14 and the tongue plate 112. The contact section 121*a* of each terminal 121 of the first terminal group 12 is exposed in the plugging space 110, and the contact section 131*a* of each terminal 131 of the second terminal group 13 is exposed in the plugging space 110. When the male connector 2 is plugged into the female connector 1, the male connector 2 is connected to the terminal 121 of the first terminal group 12 and the terminal 131 of the second terminal group 13.

In this embodiment, because the metal housing 14 is disposed around the tongue plate 112, the first terminal group 12, and the second terminal group 13, the female connector 1 can achieve a good electromagnetic interference (electromagnetic interference, EMI) function and a good electromagnetic compatibility (electromagnetic compatibility, EMC) function by using the metal housing 14.

Figure 8:
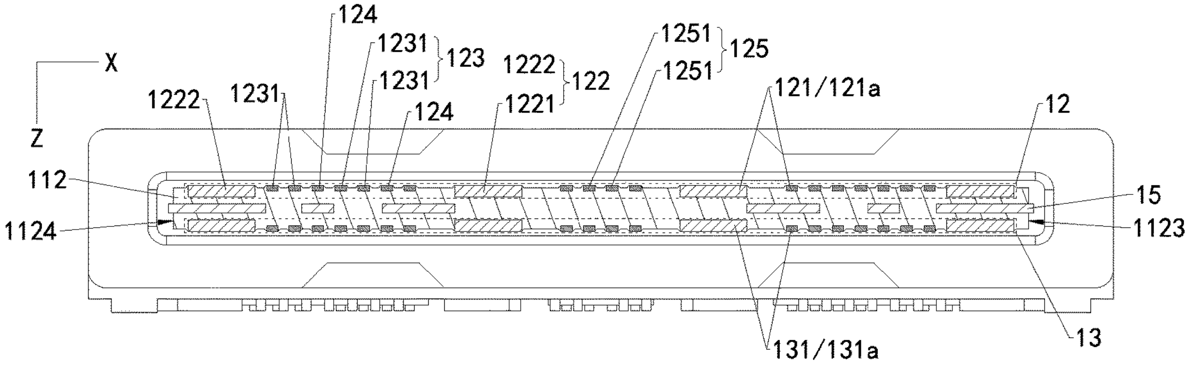
FIG. 8 is a schematic diagram of a cross-sectional structure of a partial structure of the female connector shown in FIG. 4 cut along C-C.

Refer to FIG. 6B and FIG. 8. FIG. 8 is a schematic diagram of a cross-sectional structure of a partial structure of the female connector 1 shown in FIG. 4 cut along C-C. The cross section shown in FIG. 8 passes through the contact sections 121*a* of the plurality of terminals 121 and the contact sections 131*a* of the plurality of terminals 131 of the female connector 1.

In some embodiments, the contact sections 121*a* of the plurality of terminals 121 of the first terminal group 12 and the contact sections 131*a* of the plurality of terminals 131 of the second terminal group 13 are symmetrically disposed. Cross-sectional areas of a part of the terminals 121 of the first terminal group 12 are larger than cross-sectional areas of the other part of the terminals 121. In the first terminal group 12, spacings between the part of the terminals 121 are the same, or spacings between the part of the terminals 121 are different. One side of the ground plate 15 protrudes relative to the first side surface 1123 of the tongue plate 112, and the other side of the ground plate 15 protrudes relative to the second side surface 1124 of the tongue plate 112. Refer to FIG. 5 and FIG. 8. Two ends of the ground plate 15 are also exposed in the plugging space 110. When the male connector 2 is plugged into the female connector 1, the male connector 2 is connected to the ground plate 15.

In this application, the plurality of terminals 121 in the first terminal group 12 may be named as different signal terminals based on types of signals transmitted by the plurality of terminals 121. Each signal terminal includes a contact section, a connection section, and a tail section that are sequentially connected. Locations of section structures respectively correspond to locations of the contact section 121*a*, the connection section 121*b*, and the tail section 121*c* of the terminal 121, and details are not described below again. The plurality of terminals 131 of the second terminal group 13 may be named as different signal terminals based on types of signals transmitted by the plurality of terminals 131. Each signal terminal includes a contact section, a connection section and a tail section that are sequentially connected. Locations of section structures respectively correspond to locations of the contact section 131*a*, the connection section 131*b*, and the tail section 131*c* of the terminal 131, and details are not described below again.

In some embodiments, the first terminal group 12 may include a plurality of power terminal pairs 122 and a plurality of high-speed terminal pairs 123. For example, the first terminal group 12 may include two power terminal pairs 122 and four high-speed terminal pairs 123. The power terminal pair 122 includes a power terminal 1221 and a power return ground terminal 1222. The high-speed terminal pair 123 includes two adjacent high-speed signal terminals 1231, and the high-speed terminal pair 123 may be a differential pair. Cross-sectional areas of a contact section of the power terminal 1221 and a contact section of the power return ground terminal 1222 are greater than a cross-sectional area of a contact section of the high-speed signal terminal 1231.

In this embodiment, the female connector 1 improves a through-current capability by disposing the plurality of power terminal pairs 122, and improves a signal transmission rate by disposing the plurality of high-speed terminal pairs 123. In addition, the cross-sectional areas of the contact section of the power terminal 1221 and the contact section of the power return ground terminal 1222 are set to be larger than the cross-sectional area of the contact section of the high-speed signal terminal 1231, so that the contact section of the power terminal 1221 and the contact section of the power return ground terminal 1222 have larger cross-sectional areas. Impedance of the power terminal 1221 and the power return ground terminal 1222 is small, and therefore a higher through-current capability is obtained. In addition, the contact section of the high-speed signal terminal 1231 keeps a small cross-sectional area, which not only avoids increasing an overall interface size of the female connector 1, but also helps to ensure that a high-speed signal has good high-frequency performance. Therefore, the female connector 1 can improve the through-current capacity, and can maintain a small structural size and good high-frequency performance, to meet high power, small volume and high transmission rate requirements.

In some embodiments, refer to FIG. 8 and FIG. 6B. Cross-sectional areas of a connection section of the power terminal 1221 and a connection section of the power return ground terminal 1222 are greater than a cross-sectional area of a connection section of the high-speed signal terminal 1231. Cross-sectional areas of a tail section of the power terminal 1221 and a tail section of the power return ground terminal 1222 are greater than a cross-sectional area of a tail section of the high-speed signal terminal 1231. In this case, the female connector 1 can better meet high power and high transmission rate requirements.

For example, in the power terminal 1221, the power return ground terminal 1222, and the high-speed signal terminal 1231, the cross-sectional areas of the connection section and the tail section are equal to or close to the cross-sectional area of the contact section, to ensure the through-current capability and high-speed transmission performance of the female connector 1. For example, the cross-sectional areas of the connection section and the tail section may be equal, and a ratio of the cross-sectional areas of the connection section and the tail section to the cross-sectional area of the contact section may be in a range of 0.9 to 1.1. For example, the cross-sectional area of the contact section may be slightly greater than those of the connection section and the tail segment, to ensure that the contact section is in full contact with a terminal of the male connector 2, so that a connection relationship between the male connector 2 and the female connector 1 is more reliable.

For example, a cross section of the contact section of the power terminal 1221 is rectangular, a size thereof in the first direction X may range from 0.8 mm to 1.45 mm, and a size thereof in the third direction Z may be 0.25 mm, for example, may be 1.45 mm×0.25 mm. Alternatively, the size of the cross section of the contact section of the power terminal 1221 in the first direction X may range from 1.0 mm to 1.81 mm, and a size thereof in the third direction Z may be 0.20 mm. In this embodiment, a through-current capacity of the power terminal 1221 may reach 15 A, to better meet the high power requirement.

A shape and a size of a cross section of the contact section of the power return ground terminal 1222 are the same as those of the contact section of the power terminal 1221. A cross section of the contact section of the high-speed signal terminal 1231 is rectangular, a size thereof in the first direction X is less than or equal to 0.25 mm, and a size thereof in the second direction Y is less than or equal to 0.12 mm, for example, may be 0.25 mm×0.12 mm. A specific size of a cross section of each terminal is not strictly limited in this embodiment of this application.

In some embodiments, refer to FIG. 8 and FIG. 6B. In the first terminal group 12, the cross-sectional areas of the contact section of the power terminal 1221 and the contact section of the power return ground terminal 1222 may be greater than a cross-sectional area of a contact section 121*a* of another terminal 121, to control the overall interface size while ensuring the through-current capability of the female connector 1, so that the female connector 1 meets the small volume requirement at the same time.

For example, in the first terminal group 12, shapes and sizes of cross sections of contact sections 121*a* of terminals 121 other than the power terminal 1221 and the power return ground terminal 1222 may be consistent.

In the first terminal group 12, the cross-sectional areas of the connection section of the power terminal 1221 and the connection section of the power return ground terminal 1222 may also be greater than a cross-sectional area of a connection section 121*b* of the another terminal 121. The cross-sectional areas of the tail section of the power terminal 1221 and the tail section of the power return ground terminal 1222 may also be greater than a cross-sectional area of a tail section 121*c* of the another terminal 121.

In some embodiments, as shown in FIG. 8, the contact section of the power terminal 1221 and a contact section 121*a* of an adjacent terminal 121 form a first spacing, the contact section of the high-speed signal terminal 1231 and a contact section 121*a* of an adjacent terminal 121 form a second spacing, and the first spacing is greater than the second spacing. In a terminal group, two adjacent terminals are spaced apart from each other, and a gap is formed beside the terminals. A width of the gap is a spacing between the two adjacent terminals. In this embodiment, a width of a gap beside the contact section of the power terminal 1221 is greater than a width of a gap beside the contact section of the high-speed signal terminal 1231.

It may be understood that power P=current I×voltage V. To meet the high power requirement of the female connector 1, the power terminal 1221 needs to be loaded with a high voltage. In this embodiment, the spacing between the contact section of the power terminal 1221 and the contact section 121*a* of the adjacent terminal 121 is large, so that a creepage distance between the power terminal 1221 and the adjacent terminal 121 is large enough. In this way, a function failure of the female connector 1 caused by a breakdown phenomenon due to a large voltage on the power terminal 1221 is avoided, so that reliability of the female connector 1 is high. In addition, a high voltage does not need to be loaded on the high-speed signal terminal 1231, and the spacing between the contact section of the high-speed signal terminal 1231 and the contact section 121*a* of the adjacent terminal 121 is small, which helps to make the interface size of the female connector 1 small. Therefore, the female connector 1 has high reliability and a small volume.

For example, if the female connector 1 needs to meet a transmission power of 720 W, when the power terminal 1221 can implement a through-current capability of 15 A, a voltage of 48 V needs to be loaded. The spacing between the contact section of the power terminal 1221 and the contact section 121*a* of the adjacent terminal 121 may be set to 0.85 mm to have a sufficient creepage distance. A spacing between two adjacent terminals 121 of the other terminals 121 may be set to 0.25 mm.

In some embodiments, refer to FIG. 8 and FIG. 6B. A spacing between the connection section of the power terminal 1221 and a connection section 121*b* of the adjacent terminal 121 is greater than a spacing between the connection section of the high-speed signal terminal 1231 and a connection section 121*b* of the adjacent terminal 121. A spacing between the tail section of the power terminal 1221 and a tail section 121*c* of the adjacent terminal 121 is greater than a spacing between the tail section of the high-speed signal terminal 1231 and a tail section 121*c* of the adjacent terminal 121. That is, a spacing between the power terminal 1221 and the adjacent terminal 121 is greater than a spacing between the high-speed signal terminal 1231 and the adjacent terminal 121, to ensure reliability of the female connector 1. In other words, a width of a gap beside the power terminal 1221 is greater than a width of a gap beside the high-speed signal terminal 1231.

In some embodiments, refer to FIG. 8 and FIG. 6B. In the first terminal group 12, the spacing between the contact section of the power terminal 1221 and the contact section 121*a* of the adjacent terminal 121 may be greater than a spacing between contact sections 121*a* of the two adjacent terminals 121 of the other terminals 121. The spacing between the connection section of the power terminal 1221 and the connection section 121*b* of the adjacent terminal 121 may be greater than a spacing between connection sections 121*b* of the two adjacent terminals 121 of the other terminals 121. The spacing between the tail section of the power terminal 1221 and the tail section 121*c* of the adjacent terminal 121 may be greater than a spacing between tail sections 121*c* of the two adjacent terminals 121 of the other terminals 121. In other words, the width of the gap beside the power terminal 1221 is greater than a width of a gap beside the another terminal.

In some embodiments, as shown in FIG. 8, the first terminal group 12 may further include a plurality of isolated ground terminals 124, and adjacent terminals 121 of the high-speed terminal pair 123 include the isolated ground terminal 124. In this embodiment, the isolated ground terminal 124 is disposed beside the high-speed terminal pair 123, to ensure independent high-frequency performance of the differential pair. One of the two adjacent terminals 121 of the high-speed terminal pair 123 may be the isolated ground terminal 124, or both may be the isolated ground terminals 124.

In some embodiments, as shown in FIG. 8, the isolated ground terminal 124 is disposed between the high-speed terminal pair 123 and the power terminal 1221. In this case, the isolated ground terminal 124 is configured to prevent or reduce a magnetic field generated by a current of a power supply in the power terminal 1221 from interfering with the high-speed signal transmitted in the high-speed terminal pair 123.

In some embodiments, as shown in FIG. 8, the first terminal group 12 further includes a low-speed terminal pair 125, and the low-speed terminal pair 125 includes two adjacent low-speed signal terminals 1251. It should be understood that, in this embodiment, the high-speed signal terminal 1231 is configured to transmit a high-speed signal, and the low-speed signal terminal 1251 is configured to transmit a low-speed signal. A high speed and a low speed are relative concepts. For example, the high-speed signal may be a signal whose transmission rate is greater than or equal to 1 Gbps, and the low-speed signal may be a signal whose transmission rate is less than 1 Gbps.

The isolated ground terminal 124 is disposed between the low-speed terminal pair 125 and the high-speed terminal pair 123, and the isolated ground terminal 124 is configured to isolate the high-speed signal terminal 1231 from the low-speed signal terminal 1251, to reduce or avoid mutual interference between the high-speed signal and the low-speed signal.

In some embodiments, as shown in FIG. 8, at least one terminal 121 is disposed between the power terminal 1221 and the isolated ground terminal 124, and a plurality of terminals 121 are disposed between the power terminal 1221 and the power return ground terminal 1222. In this embodiment, large spacings are set between the power terminal 1221 and the isolated ground terminal 121, and between the power terminal 1221 and the power return ground terminal 1222, to avoid corrosion and security problems caused by foreign matter or liquid inflow because positive and negative electrodes of the female connector 1 are excessively close, and improve reliability of the female connector 1.

In some embodiments, a terminal signal sequence of the first terminal group 12 is opposite to a terminal signal sequence of the second terminal group 13. To be specific, transmission signals of the plurality of terminals 121 of the first terminal group 12 and transmission signals of the plurality of terminals 131 of the second terminal group 13 are distributed in an obliquely symmetrical manner. To be specific, the plurality of terminals of the first terminal group 12 and the plurality of terminals of the second terminal group 13 are, from left to right (in other words, from one side to the other side of the tongue plate 112), divided into a first terminal to an $N^{th}$ terminal. A first terminal of the first terminal group 12 and an $N^{th}$ terminal of the second terminal group 13 are configured to transmit signals of a same type, a second terminal of the first terminal group 12 and an $(N-1)^{th}$ terminal of the second terminal group 13 are configured to transmit signals of a same type, a third terminal of the first terminal group 12 and an $(N-2)^{th}$ terminal of the second terminal group 13 are configured to transmit signals of a same type, . . . , an $(N-1)^{th}$ terminal of the first terminal group 12 and a second terminal of the second terminal group 13 are configured to transmit signals of a same type, and an $N^{th}$ terminal of the first terminal group 12 and a first terminal of the second terminal group 13 are configured to transmit signals of a same type.

In this embodiment, the contact sections 121*a* of the plurality of terminals 121 of the first terminal group 12 and the contact sections 131*a* of the plurality of terminals 131 of the second terminal group 13 are symmetrically disposed, and the terminal signal sequence of the first terminal group 12 is opposite to the terminal signal sequence of the second terminal group 13, so that the female connector 1 can allow the male connector 2 to be plugged into forward and backward, to improve user experience.

Refer to the following Table 1. Table 1 shows a terminal signal sequence 1 of the first terminal group 12, and shows a specific terminal signal sequence of the first terminal group 12 in some embodiments.

TABLE 1

| Terminal signal sequence 1 of the first terminal group 12 | | | | | | | | | | |
|---|---|---|---|---|---|---|---|---|---|---|
| 1-1 | 1-2 | 1-3 | 1-4 | 1-5 | 1-6 | 1-7 | 1-8 | 1-9 | 1-10 | 1-11 |
| GND | ML6+ | ML6− | GND | ML2+ | ML2− | GND | RSV1 | PBUS | CL1 | D1+ |
| 1-12 | 1-13 | 1-14 | 1-15 | 1-16 | 1-17 | 1-18 | 1-19 | 1-20 | 1-21 | 1-22 |
| D1− | RSV2 | PBUS | SL1 | GND | ML1− | ML1+ | GND | ML5− | ML5+ | GND |

In some embodiments, a quantity of terminals of the first terminal group 12 is 22, namely, the terminal 1-1 to the terminal 1-22. The terminal signal sequence (1-1 to 1-22) of the first terminal group 12 is sequentially: a power return ground terminal (GND), a high-speed terminal pair (ML6+ and ML6−), an isolated ground terminal (GND), a high-speed terminal pair (ML2+ and ML2−), an isolated ground terminal (GND), a first terminal (RSV1), a power terminal (PBUS), a configuration terminal (CL1), a low-speed terminal pair (D1+ and D1−), a second terminal (RSV4), a power terminal (PBUS), an auxiliary terminal (SL1), an isolated ground terminal (GND), a high-speed terminal pair (ML1+ and ML1−), an isolated ground terminal (GND), a high-speed terminal pair (ML5+ and ML5−), and a power return ground terminal (GND). The first terminal (RSV1) is configured to transmit a low-speed signal or is reserved. The configuration terminal (CL1) provides a configuration channel of the female connector 1, and is used for plugging detection, power supply negotiation, and interface configuration. The second terminal (RSV2) is configured to transmit power, a low-speed signal, or is reserved. The auxiliary terminal (SL1) provides an auxiliary channel of the female connector 1, and is used for high-speed link initialization, HDCP (high bandwidth digital content protection, high bandwidth digital content protection) handshake, capability obtaining, or audio backhaul. The low-speed terminal pair (D+ and D−) may be a USB 2.0 data channel (Data Minus/USB Data Positive).

Refer to the following Table 2. Table 2 shows a terminal signal sequence 1 of the second terminal group 13, and shows a specific terminal signal sequence of the second terminal group 13 in some embodiments.

TABLE 2

| Terminal signal sequence 1 of the second terminal group 13 | | | | | | | | | | |
|---|---|---|---|---|---|---|---|---|---|---|
| 2-1 | 2-2 | 2-3 | 2-4 | 2-5 | 2-6 | 2-7 | 2-8 | 2-9 | 2-10 | 2-11 |
| GND | ML7+ | ML7− | GND | ML3+ | ML3− | GND | SL2 | PBUS | RSV3 | D2− |
| 2-12 | 2-13 | 2-14 | 2-15 | 2-16 | 2-17 | 2-18 | 2-19 | 2-20 | 2-21 | 2-22 |
| D2+ | CL2 | PBUS | RSV4 | GND | ML0− | ML0+ | GND | ML4− | ML4+ | GND |

In some embodiments, a quantity of terminals of the second terminal group 13 is 22, namely, the terminal 2-1 to the terminal 2-22, and the terminal signal sequence (2-1 to 2-22) of the second terminal group 13 is opposite to the terminal signal sequence of the first terminal group 12. The terminal signal sequence (2-1 to 2-22) of the second terminal group 13 is sequentially: a power return ground terminal (GND), a high-speed terminal pair (ML7+ and ML7−), an isolated ground terminal (GND), a high-speed terminal pair (ML3+ and ML3−), an isolated ground terminal (GND), an auxiliary terminal (SL2), a power terminal (PBUS), a second terminal (RSV3), a low-speed terminal pair (D2+ and D2−), a configuration terminal (CL2), a power terminal (PBUS), a first terminal (RSV4), an isolated ground terminal (GND), a high-speed terminal pair (ML0+ and ML0−), an isolated ground terminal (GND), a high-speed terminal pair (ML4+ and ML4−), and a power return ground terminal (GND). For structural design and performance of each terminal, refer to the first terminal group 12. Details are not described herein again.

In this application, the terminal signal sequences of the first terminal group 12 and the second terminal group 13 may alternatively have another embodiment. The following provides an example for description.

Refer to the following Table 3. Table 3 shows a terminal signal sequence 2 of the first terminal group 12, and shows a specific terminal signal sequence of the first terminal group 12 in some other embodiments.

TABLE 3

| Terminal signal sequence 2 of the first terminal group 12 | | | | | | | | | | |
|---|---|---|---|---|---|---|---|---|---|---|
| 1-1 | 1-2 | 1-3 | 1-4 | 1-5 | 1-6 | 1-7 | 1-8 | 1-9 | 1-10 | 1-11 |
| GND | ML0+ | ML0− | GND | ML1+ | ML1− | GND | CL1 | PBUS | RSV1 | D+/UTL |
| 1-12 | 1-13 | 1-14 | 1-15 | 1-16 | 1-17 | 1-18 | 1-19 | 1-20 | 1-21 | 1-22 |
| D-/UTL | RSV2 | PBUS | SL1 | GND | ML3− | ML3+ | GND | ML2− | ML2+ | GND |

In some embodiments, a quantity of terminals of the first terminal group 12 is 22, namely, the terminal 1-1 to the terminal 1-22. The terminal signal sequence (1-1 to 1-22) of the first terminal group 12 is sequentially: a power return ground terminal (GND), a high-speed terminal pair (ML0+ and ML0−), an isolated ground terminal (GND), a high-speed terminal pair (ML1+ and ML1−), an isolated ground terminal (GND), a configuration terminal (CL1), a power terminal (PBUS), a first terminal (RSV1), a low-speed terminal pair (D+ and D−) or reserved terminal pair (UTL and UTL), a second terminal (RSV2), a power terminal (PBUS), an auxiliary terminal (SL1), an isolated ground terminal (GND), a high-speed terminal pair (ML3+ and ML3−), an isolated ground terminal (GND), a high-speed terminal pair (ML2+ and ML2−), and a power return ground terminal (GND). The reserved terminal pair (UTL and UTL) is configured to transmit a low-speed signal. The first terminal (RSV1) is configured to transmit a low-speed signal or is reserved. The configuration terminal (CL1) provides the configuration channel of the female connector 1, and may be used for plugging detection, power supply negotiation, and interface configuration. The second terminal (RSV2) is configured to transmit power, a low-speed signal, or is reserved. The auxiliary terminal (SL1) provides the auxiliary channel of the female connector 1, and is used for high-speed link initialization, HDCP (high bandwidth digital content protection, high bandwidth digital content protection) handshake, capability obtaining, or audio backhaul.

The low-speed terminal pair (D+ and D−) may be a USB 2.0 data channel (Data Minus/USB Data Positive).

In this embodiment, two power terminals (PBUS) are disposed adjacently, so that a through-current capability can be increased.

Refer to the following Table 4. Table 4 shows a terminal signal sequence 2 of the second terminal group 13, and shows a specific terminal signal sequence of the second terminal group 13 in some other embodiments.

TABLE 4

| Terminal signal sequence 2 of the second terminal group 13 | | | | | | | | | | |
|---|---|---|---|---|---|---|---|---|---|---|
| 2-1 | 2-2 | 2-3 | 2-4 | 2-5 | 2-6 | 2-7 | 2-8 | 2-9 | 2-10 | 2-11 |
| GND | ML4+ | ML4− | GND | ML5+ | ML5− | GND | SL2 | PBUS | RSV3 | D−/UTL |
| 2-12 | 2-13 | 2-14 | 2-15 | 2-16 | 2-17 | 2-18 | 2-19 | 2-20 | 2-21 | 2-22 |
| D+/UTL | RSV4 | PBUS | CL2 | GND | ML7− | ML7+ | GND | ML6− | ML6+ | GND |

In some embodiments, a quantity of terminals of the second terminal group 13 is 22, namely, the terminal 2-1 to the terminal 2-22, and the terminal signal sequence (2-1 to 2-22) of the second terminal group 13 is opposite to the terminal signal sequence of the first terminal group 12. The terminal signal sequence (2-1 to 2-22) of the second terminal group 13 is sequentially: a power return ground terminal (GND), a high-speed terminal pair (ML4+ and ML4−), an isolated ground terminal (GND), a high-speed terminal pair (ML5+ and ML5−), an isolated ground terminal (GND), an auxiliary terminal (SL2), a power terminal (PBUS), a second terminal (RSV3), a low-speed terminal pair (D+ and D−) or reserved terminal pair (UTL and UTL), a first terminal (RSV4), a power terminal (PBUS), a configuration terminal (CL2), a high-speed terminal pair (ML7+ and ML7−), an isolated ground terminal (GND), a high-speed terminal pair (ML6+ and ML6−), and a power return ground terminal (GND). For structural design and performance of each terminal, refer to the first terminal group 12. Details are not described herein again.

Quantities of terminals and the terminal signal sequences of the first terminal group 12 and the second terminal group 13 may alternatively have other forms. This is not limited in this application.

In this application, through structural design and signal sequence design of the terminals 121 of the first terminal group 12 and the terminals 131 of the second terminal group 13 of the female connector 1, the female connector 1 can meet a high power requirement of 300 W to 720 W and a high transmission rate requirement of 80 Gpbs to 192 Gpbs, so as to be better applicable to the communication system 1000. In addition, the female connector 1 may implement forward and backward insertion. This helps to improve user experience of plugging and unplugging. In another embodiment, an upper limit and a lower limit of a transmission power of the female connector 1 are not explicitly limited.

Figure 9:
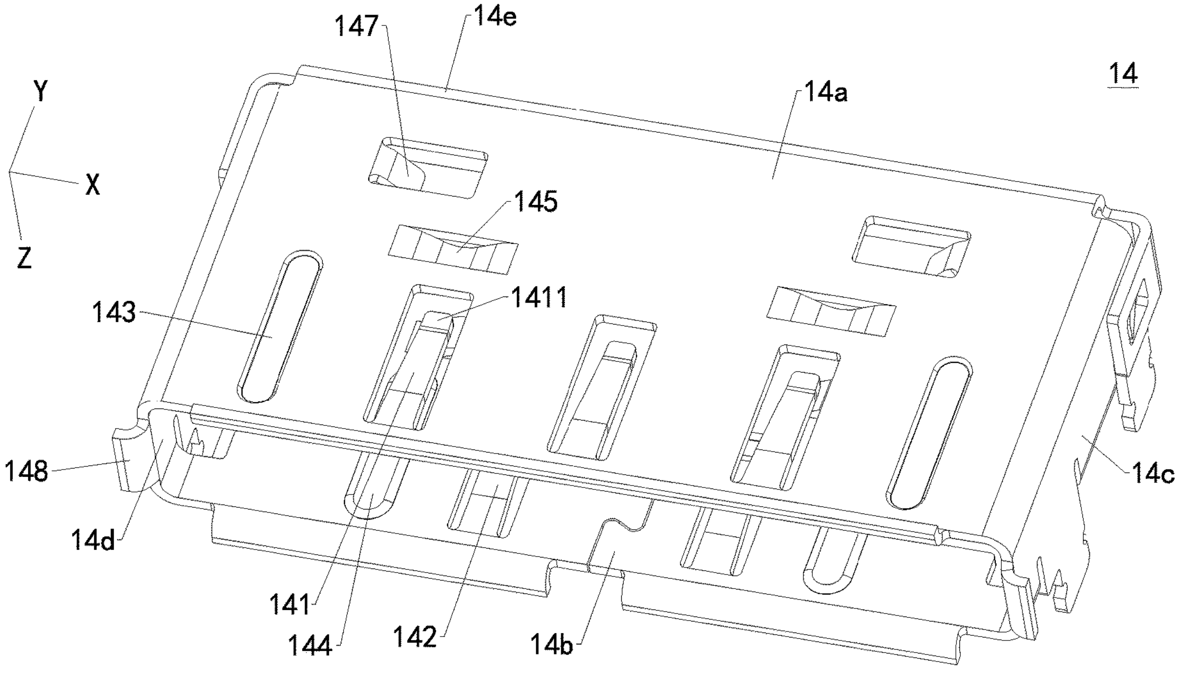
FIG. 9 is a schematic diagram of a structure of a metal housing shown in FIG. 4.
Figure 10:
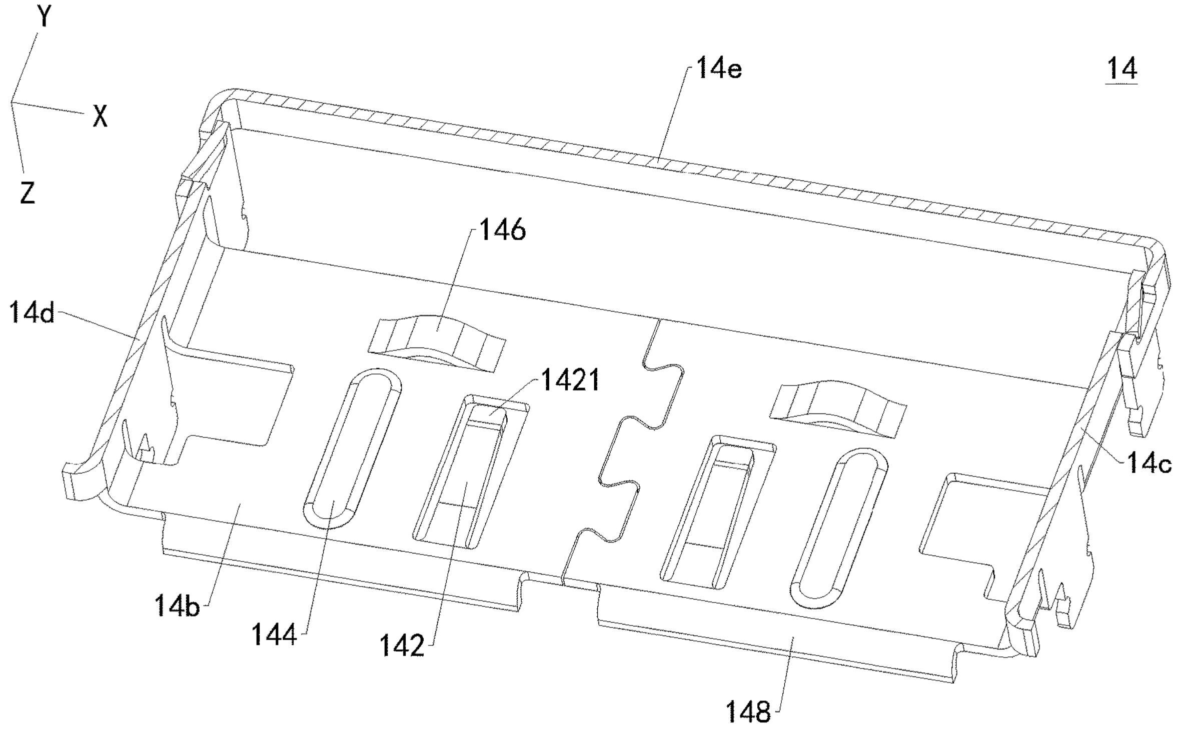
FIG. 10 is a schematic diagram of a partial structure of the metal housing shown in FIG. 9.

Refer to FIG. 9 and FIG. 10. FIG. 9 is a schematic diagram of a structure of the metal housing 14 shown in FIG. 4, and FIG. 10 is a schematic diagram of a partial structure of the metal housing 14 shown in FIG. 9.

In some embodiments, the metal housing 14 includes a first plate body 14*a* and a second plate body 14*b* that are disposed oppositely, and the first plate body 14*a* and the second plate body 14*b* are arranged in the third direction Z. The metal housing 14 further includes a third plate body 14*c*, a fourth plate body 14*d*, and a fifth plate body 14*e*. The third plate body 14*c* and the fourth plate body 14*d* are relatively located between the first plate body 14*a* and the second plate body 14*b*. The third plate body 14*c* and the fourth plate body 14*d* are arranged in the second direction Y, and the fifth plate body 14*e* is located between the first plate body 14*a* and the second plate body 14*b*. The first plate body 14*a*, the second plate body 14*b*, the third plate body 14*c*, the fourth plate body 14*d*, and the fifth plate body 14*e* may be integrally formed structural parts, and an integrated and complete metal plate body is stamped and bent to form the plurality of plate structures of the metal housing 14. The inner side of the metal housing 14 forms an accommodation space for mounting another structure. The metal housing 14 has an opening on one side, and the opening is disposed opposite to the fifth plate body 14*e*. The metal housing 14 further has a through gap, and the gap is located at a joint between the second plate body 14*b* and the fifth plate body 14*e*. The second plate body 14*b* may be formed by welding and splicing two parts.

For example, the metal housing 14 further includes a first spring plate 141 and a second spring plate 142. One end of the first spring plate 141 is connected to the first plate body 14*a*, and the other end of the first spring plate 141 is bent inward in the third direction Z and suspended. To be specific, the first spring plate 141 includes a free end 1411 that is away from the first plate body 14*a*, and the free end 1411 is disposed closer to the second plate body 14*b* compared with the first plate body 14*a*. The first spring plate 141 is electrically connected to the first plate body 14*a*. The first spring plate 141 and the first plate body 14*a* may be integrally formed structural parts. For example, the first plate body 14*a* and the first spring plate 141 are formed by stamping a metal plate body. In this case, the first plate body 14*a* forms a through hole corresponding to the first spring plate 141. When the first spring plate 141 is pressed under force, the first spring plate 141 may be partially accommodated in the through hole, so that the female connector 1 does not need to reserve a large spring plate movement space. This helps to reduce a thickness of the female connector 1, and implement miniaturization. There may be a plurality of first spring plates 141, for example, three, and the plurality of first spring plates 141 are arranged at spacings in the first direction X. In some other embodiments, there may alternatively be one first spring plate 141, two first spring plates 141, or another quantity of first spring plates 141. This is not strictly limited in this application.

One end of the second spring plate 142 is connected to the second plate body 14*b*, and the other end of the second spring plate 142 is bent inward in the third direction Z and suspended. The second spring plate 142 includes a free end 1421 that is away from the second plate body 14*b*, and the free end 1421 is disposed closer to the first plate body 14*a* compared with the second plate body 14*b*. The second spring plate 142 is electrically connected to the second plate body 14*b*. The second spring plate 142 and the second plate body 14*b* may be integrally formed structural parts. For example, the second plate body 14*b* and the second spring plate 142 are formed by stamping a metal plate body. In this case, the second plate body 14*b* forms a through hole corresponding to the second spring plate 142. When the second spring plate 142 is pressed under force, the second spring plate 142 may be partially accommodated in the through hole, so that the female connector 1 does not need to reserve a large spring plate movement space. This helps to reduce the thickness of the female connector 1, and implement miniaturization. There may be a plurality of second spring plates 142, for example, two, and the plurality of second spring plates 142 are arranged at spacings in the first direction X. In some other embodiments, there may alternatively be one second spring plate 142, three second spring plates 142, or another quantity of second spring plates 142. This is not strictly limited in this application.

The second spring plate 142 and the first spring plate 141 may be disposed in a staggered manner, or may be disposed directly opposite to each other, or may be partially disposed directly opposite to each other and partially disposed in a staggered manner. A structure of the second spring plate 142 may be the same as or different from a structure of the first spring plate 141.

In some embodiments, as shown in FIG. 9 and FIG. 10, the metal housing 14 further includes a first protective boss 143 and a second protective boss 144. The first protective boss 143 protrudes on an inner wall of the first plate body 14*a*, in other words, the first protective boss 143 protrudes relative to the inner wall of the first plate body 14*a*, and is connected to the first plate body 14*a*. The first protective boss 143 has a top surface facing away from the first plate body 14*a*, and a height of the first protective boss 143 is a distance between the top surface of the first protective boss 143 and the inner wall of the first plate body 14*a*. The free end 1411 of the first spring plate 141 has a top surface facing away from the first plate body 14*a*, and a height of the first spring plate 141 is a distance between the top surface of the free end 1411 of the first spring plate 141 and the inner wall of the first plate body 14*a*. The height of the first protective boss 143 is less than the height of the first spring plate 141.

The first protective boss 143 and the first plate body 14*a* may be integrally formed structural parts, for example, the first plate body 14*a* and the first protective boss 143 are formed by stamping a metal plate body. For example, the first spring plate 141, the first protective boss 143, and the first plate body 14*a* are integrally formed structural parts. There may be a plurality of first protective bosses 143, and the plurality of first protective bosses 143 are arranged at spacings in the first direction X. For example, there may be two first protective bosses 143, and the plurality of first spring plates 141 are located between the two first protective bosses 143. In some other embodiments, there may alternatively be one first protective boss 143, three first protective bosses 143, or another quantity of first protective bosses 143. This is not strictly limited in this application.

The second protective boss 144 protrudes on an inner wall of the second plate body 14*b*. The second protective boss 144 has a top surface facing away from the second plate body 14*b*, and a height of the second protective boss 144 is a distance between the top surface of the second protective boss 144 and the inner wall of the second plate body 14*b*. The free end 1421 of the second spring plate 142 has a top surface facing away from the second plate body 14*b*, and a height of the second spring plate 142 is a distance between the top surface of the free end 1421 of the second spring plate 142 and the inner wall of the second plate body 14*b*. The height of the second protective boss 144 is less than the height of the second spring plate 142.

A part of the second plate body 14*b* and the second protective boss 144 may be formed by stamping a metal plate body. There may be a plurality of second protective bosses 144, and the plurality of second protective bosses 144 are arranged at spacings in the first direction X. For example, there may be two second protective bosses 144, and the plurality of second spring plates 142 are located between the two second protective bosses 144. In some other embodiments, there may alternatively be one second protective boss 144, three second protective bosses 144, or another quantity of second protective bosses 144. This is not strictly limited in this application.

Refer to FIG. 5. The first plate body 14*a* of the metal housing 14 faces the first terminal group 12, the second plate body 14*b* faces the second terminal group 13, and both the free end of the first spring plate 141 and the free end of the second spring plate 142 are disposed close to the tongue plate 112. When the male connector 2 is plugged into the plugging space 110 of the female connector 1, the first spring plate 141 and the second spring plate 142 abut against the male connector 2, and the first spring plate 141 and the second spring plate 142 are deformed by being squeezed by the male connector 2.

In this embodiment, the free ends of the first spring plate 141 and the second spring plate 142 abut against the male connector 2, and the free ends are easily displaced by force, so that the male connector 2 is easily plugged into the female connector 1. In addition, the free ends are easily reset after the male connector 2 is pulled out. Therefore, reliability of the metal housing 14 and the female connector 1 is high.

The first protective boss 143 can prevent the male connector 2 from directly contacting the inner wall of the first plate body 14*a*, so that a specific gap between the male connector 2 and the inner wall of the first plate body 14*a* is always maintained, thereby avoiding an overvoltage phenomenon of the first spring plate 141, so as to improve reliability of the metal housing 14 and the female connector 1. Similarly, the second protective boss 144 can prevent the male connector 2 from directly contacting the inner wall of the second plate body 14*b*, so that a specific gap between the male connector 2 and the inner wall of the second plate body 14*b* is always maintained, thereby avoiding an overvoltage phenomenon of the second spring plate 142, so as to improve reliability of the metal housing 14 and the female connector 1.

In some other embodiments, the first protective boss 143 of the metal housing 14 is protruded on the inner wall of the first plate body 14*a*, one end of the first spring plate 141 is connected to the first protective boss 143, and the other end of the first spring plate 141 is bent inward and suspended. The second protective boss 144 is protruded on the inner wall of the second plate body 14*b*, one end of the second spring plate 142 is connected to the second protective boss 144, and the other end of the second spring plate 142 is bent inward and suspended. In this embodiment, the first protective boss 143 may be configured to protect the first spring plate 141, and the second protective boss 144 may be configured to protect the second spring plate 142.

There may be a plurality of first protective bosses 143, there may be a plurality of first spring plates 141, and the plurality of first spring plates 141 are connected to the first protective bosses 143 in a one-to-one correspondence. Alternatively, there is one first protective boss 143, there are a plurality of first spring plates 141, and the plurality of first spring plates 141 are all connected to the same first protective boss 143. For designs of the second protective boss 144 and the second spring plate 142, refer to the first protective boss 143 and the first spring plate 141. Details are not described herein again.

In some embodiments, as shown in FIG. 9 and FIG. 10, the metal housing 14 further includes a first limiting block 145 and a second limiting block 146. The first limiting block 145 is connected to the first plate body 14*a* and protrudes relative to the inner wall of the first plate body 14*a*. The first limiting block 145 may be in an arc-shaped arm shape, two ends of the first limiting block 145 are both connected to the first plate body 14*a*, and a middle part of the first limiting block 145 protrudes. The first limiting block 145 and the first plate body 14*a* may be integrally formed structural parts, for example, the first plate body 14*a* and the first limiting block 145 are formed by stamping a metal plate body. There are a plurality of first limiting blocks 145, and the plurality of first limiting blocks 145 may be arranged in the first direction X. The first limiting block 145 may be located on a side that is of the first spring plate 141 and that is close to the fifth plate body 14*e*.

The second limiting block 146 is connected to the second plate body 14*b* and protrudes relative to the inner wall of the second plate body 14*b*. The second limiting block 146 may be in an arc-shaped arm shape, two ends of the second limiting block 146 are both connected to the second plate body 14*b*, and a middle part of the second limiting block 146 protrudes. The first limiting block 145 and the first plate body 14*a* may be formed by stamping a metal plate body. There are a plurality of second limiting blocks 146, and the plurality of second limiting blocks 146 may be arranged in the first direction X. The second limiting block 146 may be located on a side that is of the second spring plate 142 and that is close to the fifth plate body 14*e*.

As shown in FIG. 9, the metal housing 14 further includes a clamping block 147. The clamping block 147 is connected to the first plate body 14*a* and protrudes relative to the inner wall of the first plate body 14*a*. For example, the clamping block 147 may be of a cantilever structure, in other words, one end of the clamping block 147 is connected to the first plate body 14*a*, and the other end of the clamping block 147 is bent inward in the third direction Z and suspended. The clamping block 147 and the first plate body 14*a* may be integrally formed structural parts, for example, the first plate body 14*a* and the clamping block 147 are formed by stamping a metal plate body. There may be a plurality of clamping blocks 147, and the plurality of clamping blocks 147 are arranged in the first direction X. The clamping block 147 may be located on a side that is of the first limiting block 145 and that is close to the fifth plate body 14*e*.

Figure 11:
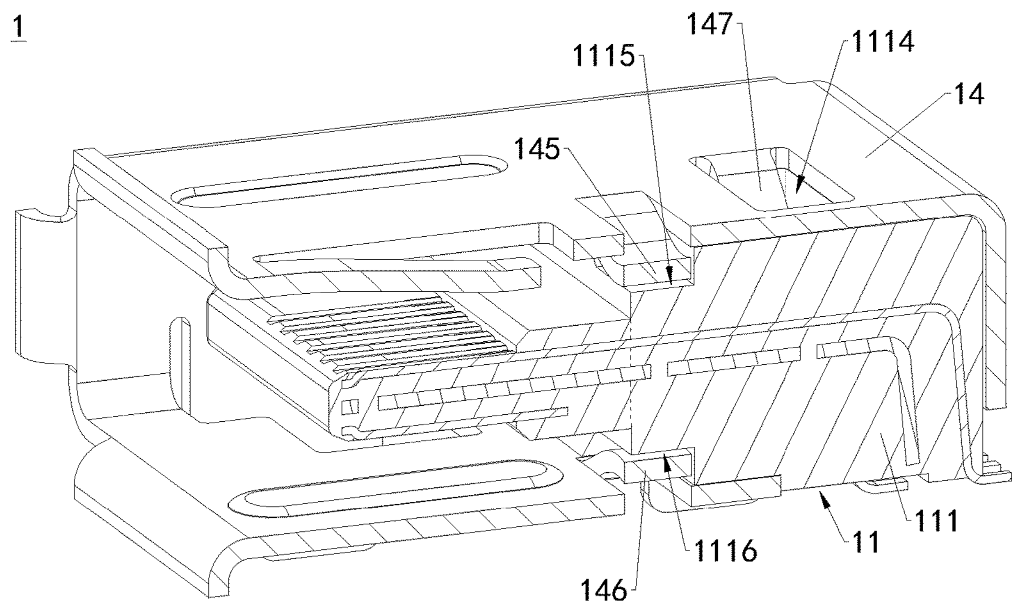
FIG. 11 is a schematic diagram of a cross-sectional structure of a female connector shown in FIG. 2 cut along D-D.

FIG. 11 is a schematic diagram of a cross-sectional structure of the female connector 1 shown in FIG. 2 cut along D-D.

In some embodiments, the insulating body 11 is mounted on the inner side of the metal housing 14, the first limiting block 145 of the metal housing 14 is clamped into the second groove 1115 of the base body 111, the second limiting block 146 is clamped into the third groove 1116 of the base body 111, and the clamping block 147 is clamped into the first groove 1114, so that the metal housing 14 and the insulating body 11 are fastened to each other, and connection stability between the metal housing 14 and the insulating body 11 is higher.

In some embodiments, as shown in FIG. 9 and FIG. 10, the metal housing 14 further includes a plurality of guide plates 148. The plurality of guide plates 148 may be separately connected to the first plate body 14*a*, the second plate body 14*b*, the third plate body 14*c*, and the fourth plate body 14*d*. The plurality of guide plates 148 are disposed around the opening of the metal housing 14, and are configured to guide the male connector 2 to be smoothly plugged into the female connector 1, so as to improve user experience of plugging and unplugging. For example, the guide plate 148 may be an arc-shaped arm, and the guide plate 148 includes a fastening end and a free end. The fastening end of the guide plate 148 is connected to the first plate body 14*a*, the second plate body 14*b*, the third plate body 14*c*, or the fourth plate body 14*d*. The free end of the guide plate 148 is suspended, and free ends of the plurality of guide plates 148 extend in a direction away from each other.

Figure 12:
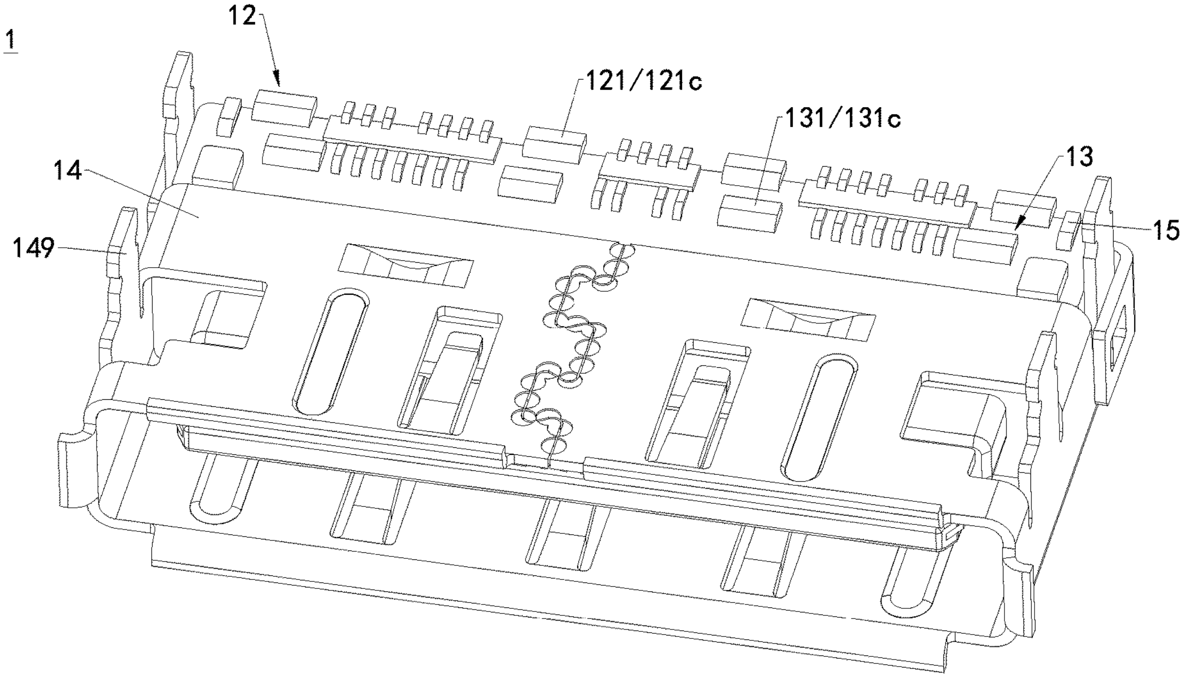
FIG. 12 is a schematic diagram of a structure of a female connector shown in FIG. 2 at another angle.

FIG. 12 is a schematic diagram of a structure of the female connector 1 shown in FIG. 2 at another angle.

In some embodiments, the metal housing 14 is provided with a plurality of feet 149. The tail sections 121*c* of the plurality of terminals 121 of the first terminal group 12 are exposed relative to the metal housing 14, the tail sections 131*c* of the plurality of terminals 131 of the second terminal group 13 are exposed relative to the metal housing 14, and a tail end of the second portion of the ground plate 15 are exposed relative to the metal housing 14.

Figure 13:
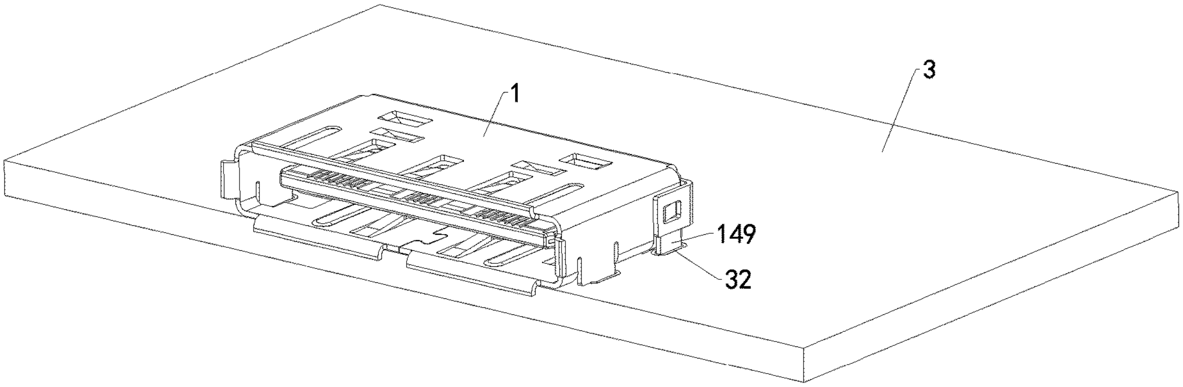
FIG. 13 is a schematic diagram of a structure of a connection between the female connector shown in FIG. 12 and a circuit board.
Figure 14:
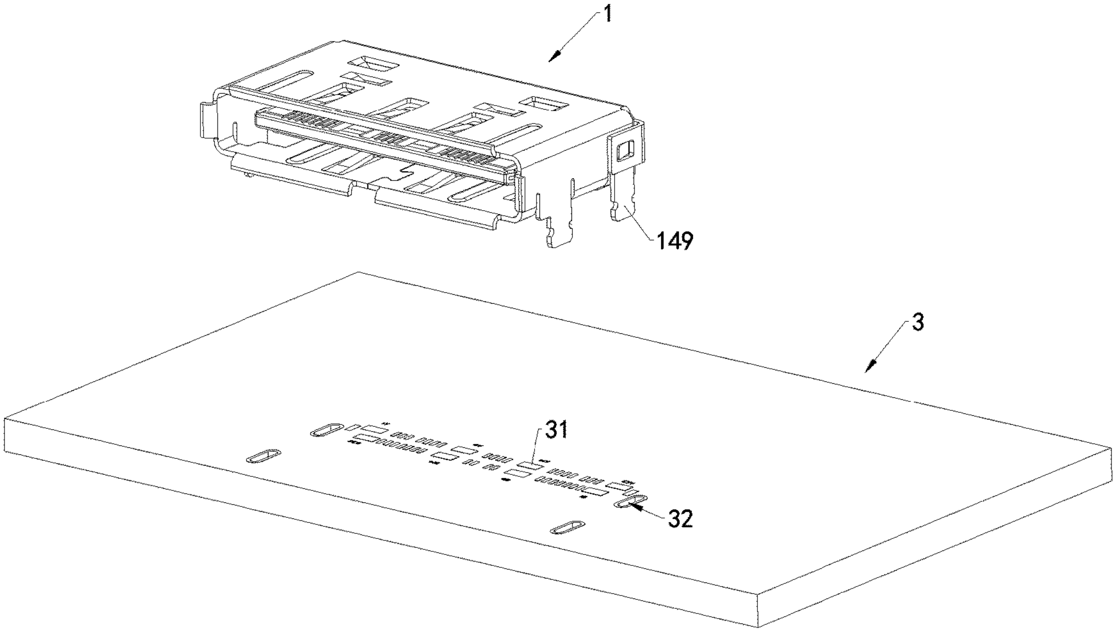
FIG. 14 is a schematic diagram of an exploded structure of the structure shown in FIG. 13.

Refer to FIG. 13 and FIG. 14. FIG. 13 is a schematic diagram of a structure of a connection between the female connector 1 shown in FIG. 12 and a circuit board 3, and FIG. 14 is a schematic diagram of an exploded structure of the structure shown in FIG. 13.

In some embodiments, when the female connector 1 is disposed in a device (for example, a smart screen), the device includes a built-in circuit board 3, and the female connector 1 is fastened to and electrically connected to the circuit board 3. Specifically, the circuit board 3 is provided with a plurality of solder pads 31, and the plurality of solder pads 31 include solder pads configured to transmit a power signal, a high-speed signal, a ground signal, and another signal. The circuit board 3 is further provided with a plurality of jacks 32, and a ground pad may be disposed on the top and/or a hole wall of the jack 32. Refer to FIG. 12 to FIG. 14. The tail section 121*c* of the terminal 121 of the first terminal group 12 and the tail section 131*c* of the terminal 131 of the second terminal group 13 of the female connector 1 are welded to the plurality of solder pads 31 on the circuit board 3, and the plurality of feet 149 are separately inserted into the plurality of jacks 32. For example, the plurality of feet 149 may be electrically connected to the ground pad, so that the metal housing 14 is grounded.

Figure 15:
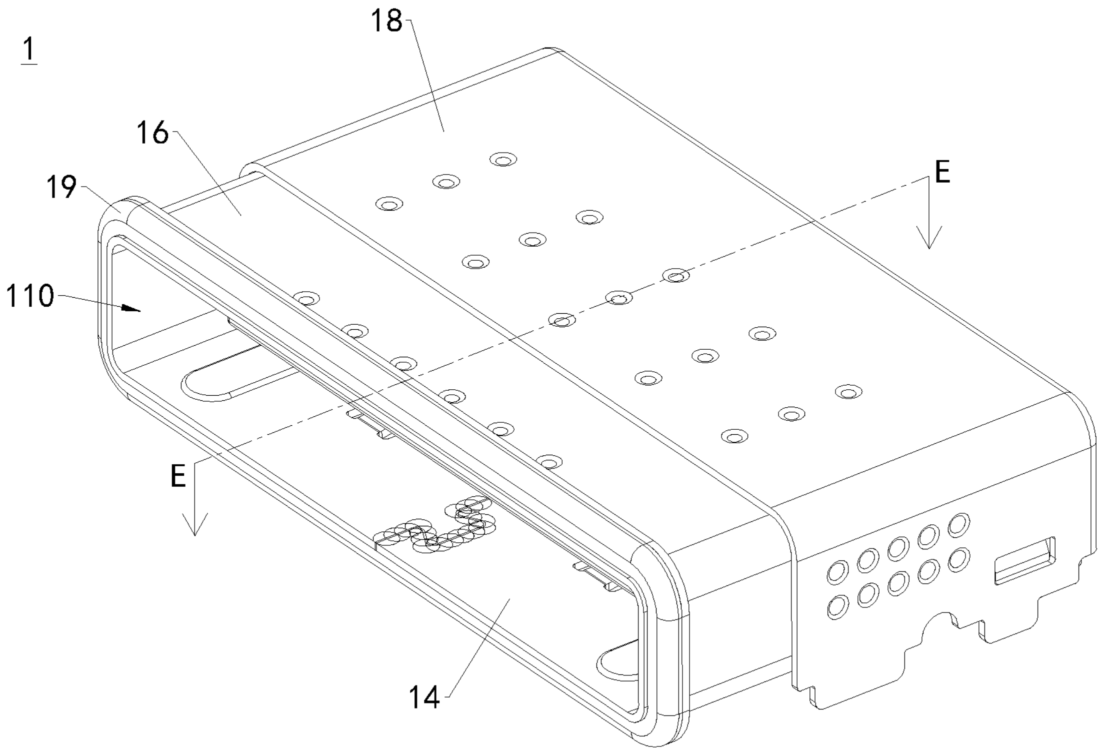
FIG. 15 is a schematic diagram of a structure of a female connector in some other embodiments according to an embodiment of this application.
Figure 16:
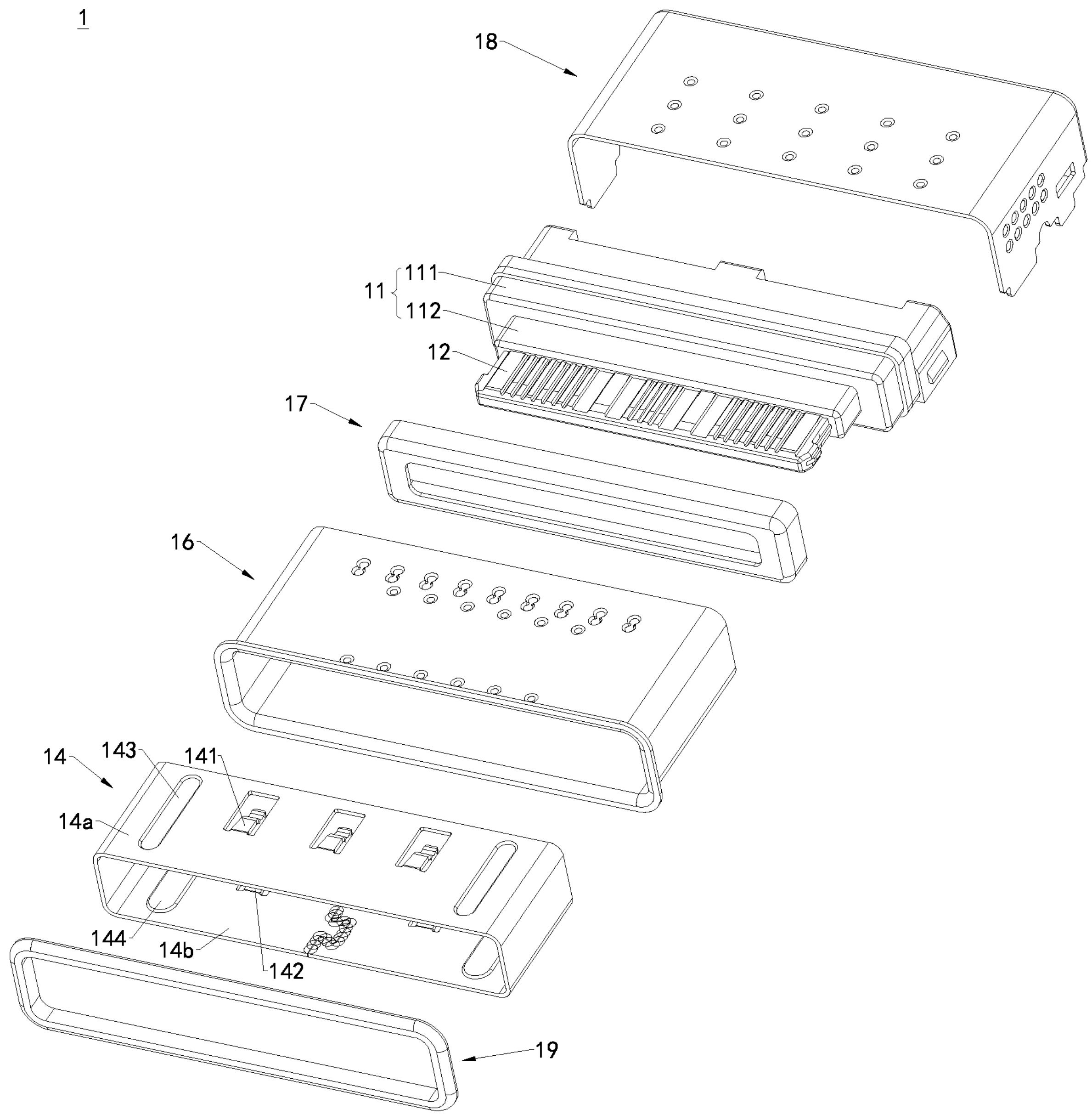
FIG. 16 is a schematic diagram of an exploded structure of the female connector shown in FIG. 15.
Figure 17:
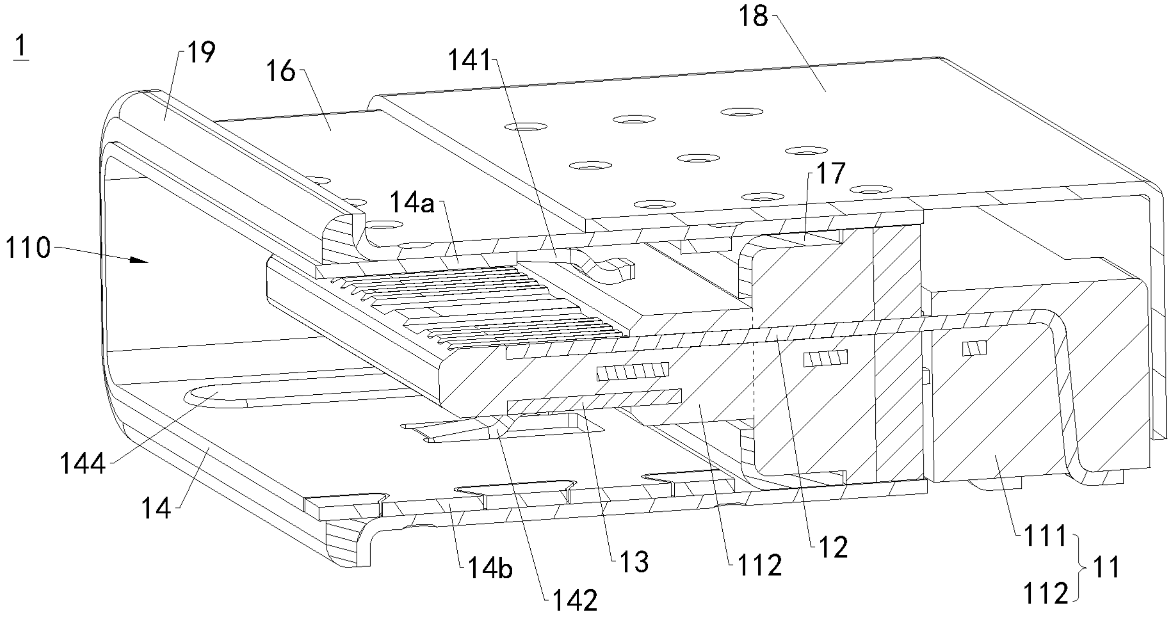
FIG. 17 is a schematic diagram of a cross-sectional structure of the female connector shown in FIG. 15 cut along E-E.

Refer to FIG. 15 to FIG. 17. FIG. 15 is a schematic diagram of a structure of a female connector 1 in some other embodiments according to an embodiment of this application. FIG. 16 is a schematic diagram of an exploded structure of the female connector 1 shown in FIG. 15. FIG. 17 is a schematic diagram of a cross-sectional structure of the female connector 1 shown in FIG. 15 cut along E-E. The female connector 1 in this embodiment includes most features of the female connector 1 in the foregoing embodiments, and the female connector 1 in this embodiment may be in plug-in cooperation with the male connector 2 shown in FIG. 2. The following mainly describes differences between the female connector 1 in this embodiment and the female connector in the foregoing embodiments.

In some embodiments, the female connector 1 includes a first terminal group 12, a second terminal group 13, an insulating body 11, and a metal housing 14. The insulating body 11 includes a base body 111 and a tongue plate 112, and the tongue plate 112 is fastened to one side of the base body 111. The first terminal group 12 and the second terminal group 13 are fastened to the insulating body 11. A part of a plurality of terminals of the first terminal group 12 is embedded in the base body 111, and the other part is fastened to the tongue plate 112 and exposed relative to the tongue plate 112. A part of a plurality of terminals of the second terminal group 13 is embedded in the base body 111, and the other part is fastened to the tongue plate 112 and exposed relative to the tongue plate 112. The metal housing 14 surrounds the tongue plate 112 and is fixedly connected to the insulating body 11, and a plugging space 110 is formed between the metal housing 14 and the tongue plate 112. A part of the terminals of the first terminal group 12 and a part of the terminals of the second terminal group 13 are exposed in the plugging space 110. For related designs of the first terminal group 12 and the second terminal group 13, refer to the foregoing embodiments. Details are not described herein again.

As shown in FIG. 16, the metal housing 14 includes a first plate body 14*a* and a second plate body 14*b* that are disposed oppositely. The metal housing 14 further includes a first spring plate 141 and a first protective boss 143 that are connected to the first plate body 14*a*. The first spring plate 141 and the first protective boss 143 are arranged in a staggered manner. For a specific design, refer to the foregoing embodiments. The metal housing 14 further includes a second spring plate 142 and a second protective boss 144 that are connected to the second plate body 14*b*. The second spring plate 142 and the second protective boss 144 are arranged in a staggered manner. For a specific design, refer to the foregoing embodiments. A metal plate is stamped and bent to form a basic structure of the metal housing 14, and then a stable sleeve structure can be formed through welding.

In some embodiments, the female connector 1 further includes a metal casing 16. The metal casing 16 is sleeved on an outer side of the metal housing 14, the metal casing 16 is fixedly and electrically connected to the metal housing 14, and the metal casing 16 is a complete sleeve structure. The metal casing 16 is a pumping housing with a complete structure, and a through-hole structure that may cause water inlet and dust inlet is not disposed on the metal casing 16, to meet a sealing requirement. In this embodiment, cooperation between the metal housing 14 and the metal casing 16 makes the female connector 1 balance an EMI function and a waterproof function, to have better reliability. In this embodiment, the female connector 1 can reach an IPX8 waterproof level by using the foregoing structures.

The metal casing 16 may be in interference fit with the first plate body 14*a* and the second plate body 14*b* of the metal housing 14, to better implement a sealing function. For example, the metal casing 16 and the metal housing 14 may be designed in structural dimensions, so that there is specific magnitude of interference between the metal casing 16 and the metal housing 14. After the metal casing 16 and the metal housing 14 are assembled, the metal casing 16 may be further pressed up and down, so that the interference fit between the metal casing 16 and the first plate body 14*a* and the second plate body 14*b* is more reliable. In addition, the metal casing 16 and the metal housing 14 may be fastened to each other through laser welding. Certainly, the metal casing 16 and the metal housing 14 may alternatively be fastened and electrically connected to each other in another manner. This is not strictly limited in this application.

In some embodiments, the female connector 1 further includes a metal ferrule 17. The metal ferrule 17 is fastened to the base body 111 and disposed around the base body 111, the metal ferrule 17 is located on an inner side of the metal casing 16, and the metal ferrule 17 is fixedly connected to the metal casing 16. The metal casing 16 is connected to both the metal housing 14 and the metal ferrule 17, and the metal ferrule 17 is fastened to the base body 111. Therefore, both the metal casing 16 and the metal housing 14 are fastened relative to the base body 111. For example, the metal ferrule 17 may be fixedly connected to the base body 111 through molding, integral molding, clamping, or the like. This is not strictly limited in this application. A shape of a cross section of the metal ferrule 17 may be roughly an "L" shape, a "one" shape, or another shape. This is not strictly limited in this application. The metal casing 16 may be fixedly connected to the metal ferrule 17 and the metal housing 14 through laser welding.

In some embodiments, the female connector 1 further includes a metal cover 18. The metal cover 18 is fixedly connected to the metal casing 16 and the base body 111, and surrounds a part of the metal casing 16 and a part of the base body 111. For example, the metal cover 18 may be fixedly connected to the metal casing 16 through laser welding or the like. The metal cover 18 may further be fixedly connected to the base body 111 through clamping or the like. The metal cover 18 may be electrically connected to the metal casing 16.

In some embodiments, the female connector 1 further includes a sealing ring 19. The sealing ring 19 surrounds the outer side of the metal housing 14, and is disposed close to an opening of the plugging space 110. The sealing ring 19 is continuously connected to an end peripheral edge of the metal housing 14 and an end peripheral edge of the metal casing 16, to seal a gap between the metal housing 14 and the metal casing 16, thereby improving waterproof performance of the female connector 1. In addition, disposing of the sealing ring 19 makes an appearance of the female connector 1 more smooth, thereby improving appearance experience.

Figure 18:
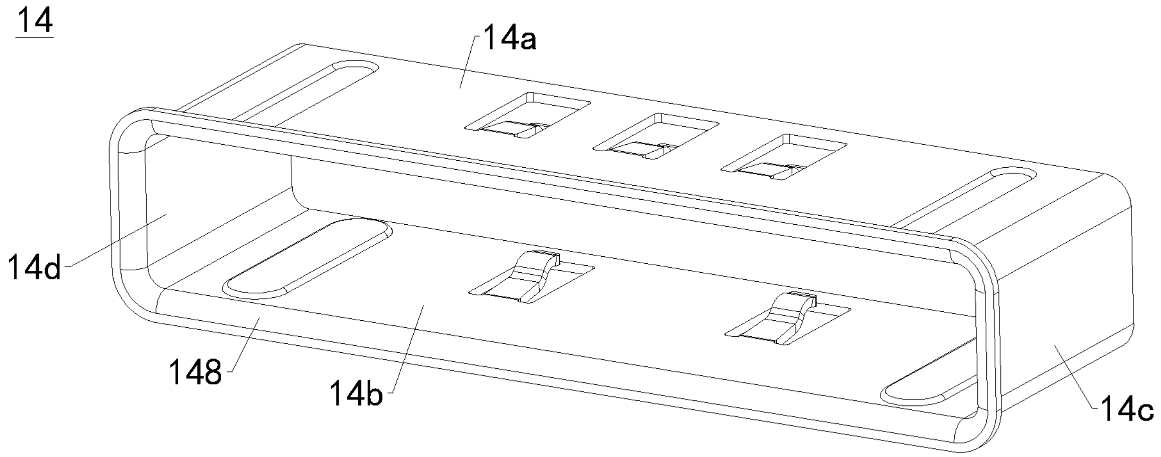
FIG. 18 is a schematic diagram of a structure of a metal housing shown in FIG. 16 in some other embodiments.

FIG. 18 is a schematic diagram of a structure of the metal housing 14 shown in FIG. 16 in some other embodiments. The metal housing 14 in this embodiment includes some features of the foregoing metal housing 14, and the following mainly describes differences between the metal housing 14 and the foregoing metal housing 14.

In some embodiments, the metal housing 14 further includes a guide plate 148. The guide plate 148 is connected to the first plate body 14*a*, a third plate body 14*c*, the second plate body 14*b*, and a fourth plate body 14*d*, and is configured to guide the male connector 2 to be smoothly plugged into the plugging space 110. The guide plate 148 may be a continuous structure, or may include a plurality of parts that are independent of each other. This is not strictly limited in this embodiment of this application.

Figure 19:
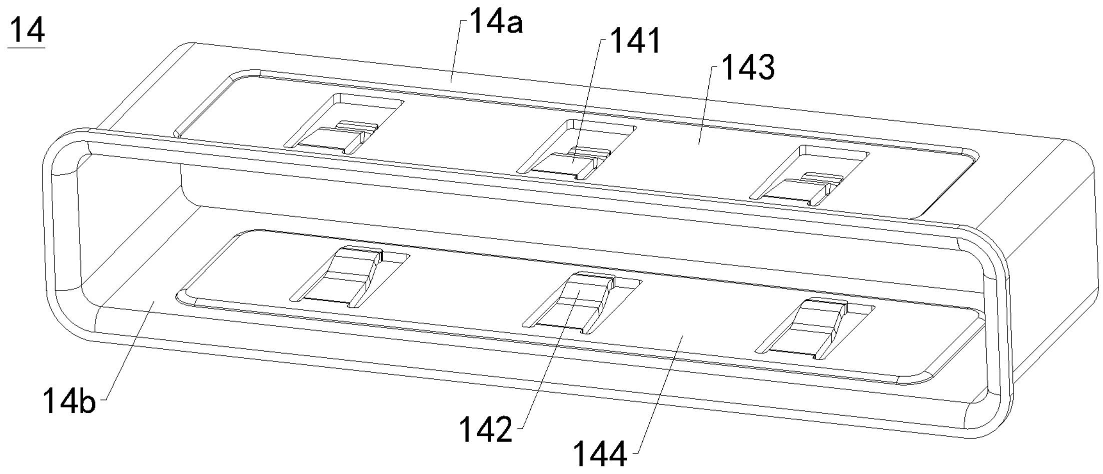
FIG. 19 is a schematic diagram of a structure of a metal housing shown in FIG. 16 in some other embodiments.

FIG. 19 is a schematic diagram of a structure of the metal housing 14 shown in FIG. 16 in some other embodiments. The metal housing 14 in this embodiment includes some features of the foregoing metal housing 14, and the following mainly describes differences between the metal housing 14 and the foregoing metal housing 14.

In some embodiments, the metal housing 14 further includes a first protective boss 143, a second protective boss 144, a first spring plate 141, and a second spring plate 142. The first protective boss 143 is protruded on an inner wall of the first plate body 14*a*, one end of the first spring plate 141 is connected to the first protective boss 143, and the other end of the first spring plate 141 is bent inward and suspended. There are a plurality of first spring plates 141, there is one first protective boss 143, and the plurality of first spring plates 141 are connected to the same first protective boss 143. The second protective boss 144 is protruded on an inner wall of the second plate body 14*b*, one end of the second spring plate 142 is connected to the second protective boss 144, and the other end of the second spring plate 142 is bent inward and suspended. There are a plurality of second spring plates 142, there is one second protective boss 144, and the plurality of second spring plates 142 are connected to the same second protective boss 144.

Figure 20:
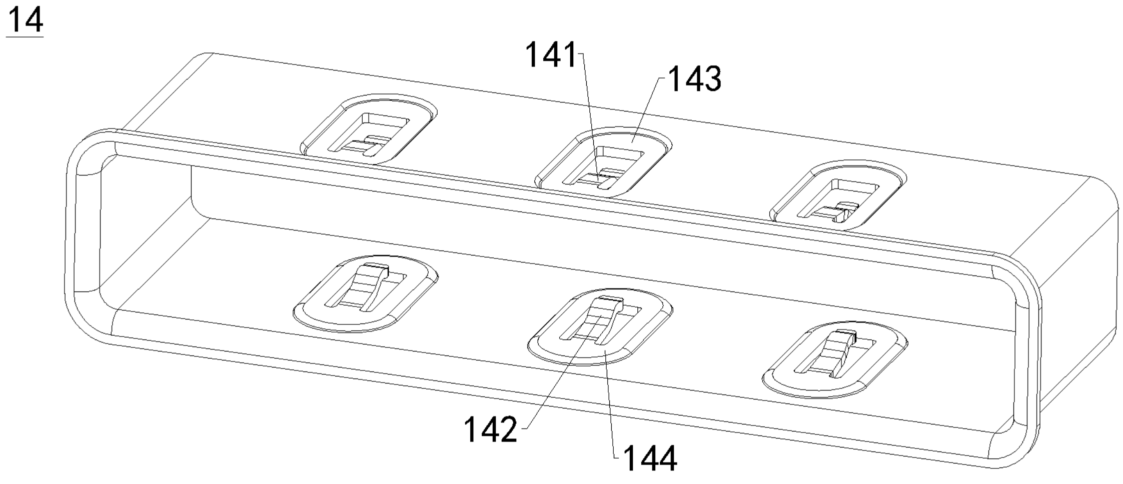
FIG. 20 is a schematic diagram of a structure of a metal housing shown in FIG. 16 in some other embodiments.

FIG. 20 is a schematic diagram of a structure of the metal housing 14 shown in FIG. 16 in some other embodiments. The metal housing 14 in this embodiment includes some features of the foregoing metal housing 14, and the following mainly describes differences between the metal housing 14 and the foregoing metal housing 14.

In some embodiments, there are a plurality of first spring plates 141, there are a plurality of first protective bosses 143, and the plurality of first spring plates 141 are separately connected to different first protective bosses 143. There are a plurality of second spring plates 142, there are a plurality of second protective bosses 144, and the plurality of second spring plates 142 are separately connected to different second protective bosses 144.

Figure 21:
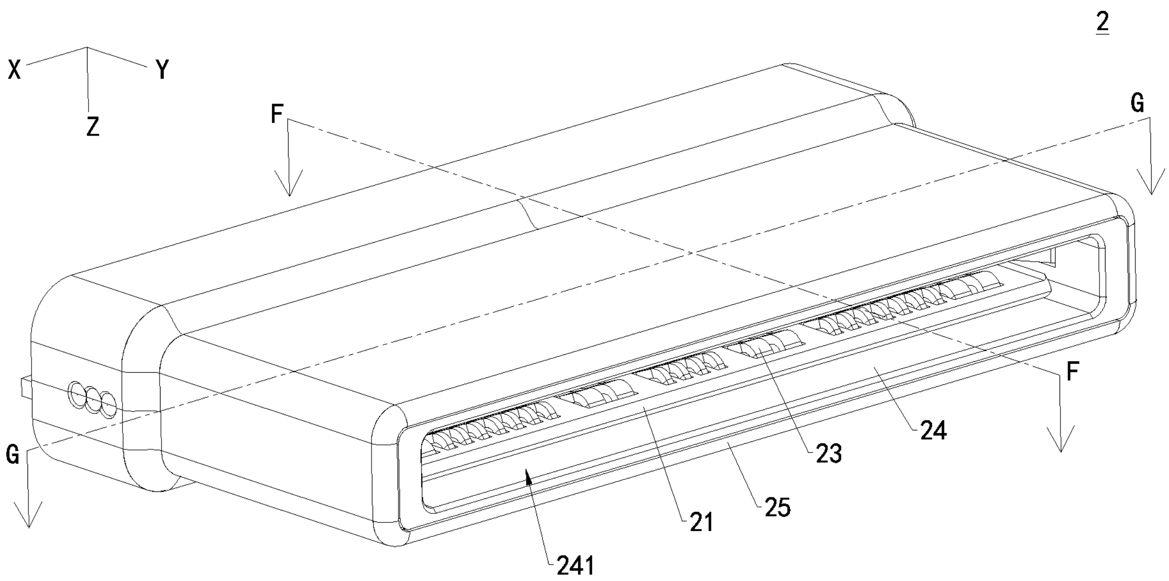
FIG. 21 is a schematic diagram of a structure of a male connector shown in FIG. 2.
Figure 22:
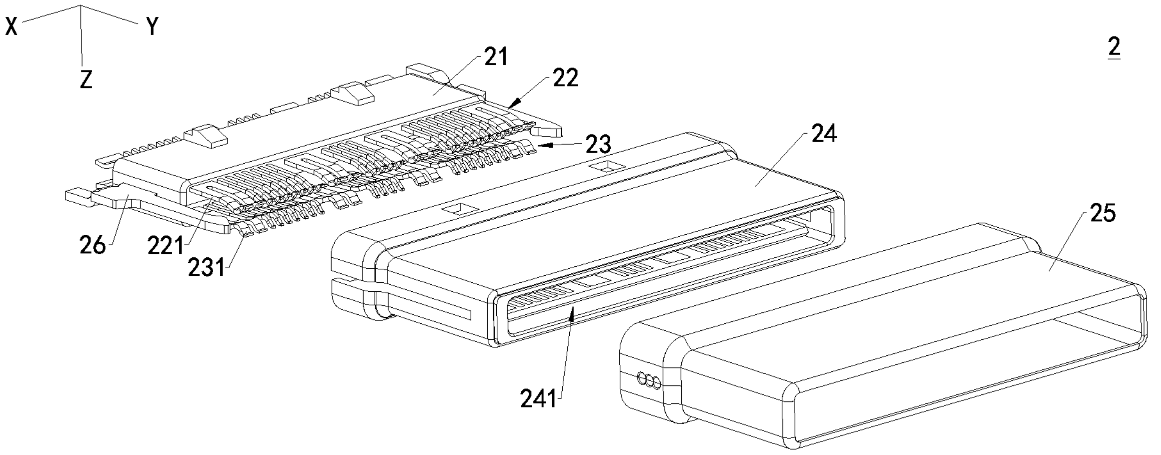
FIG. 22 is a schematic diagram of a partial exploded structure of the male connector shown in FIG. 21.
Figure 23:
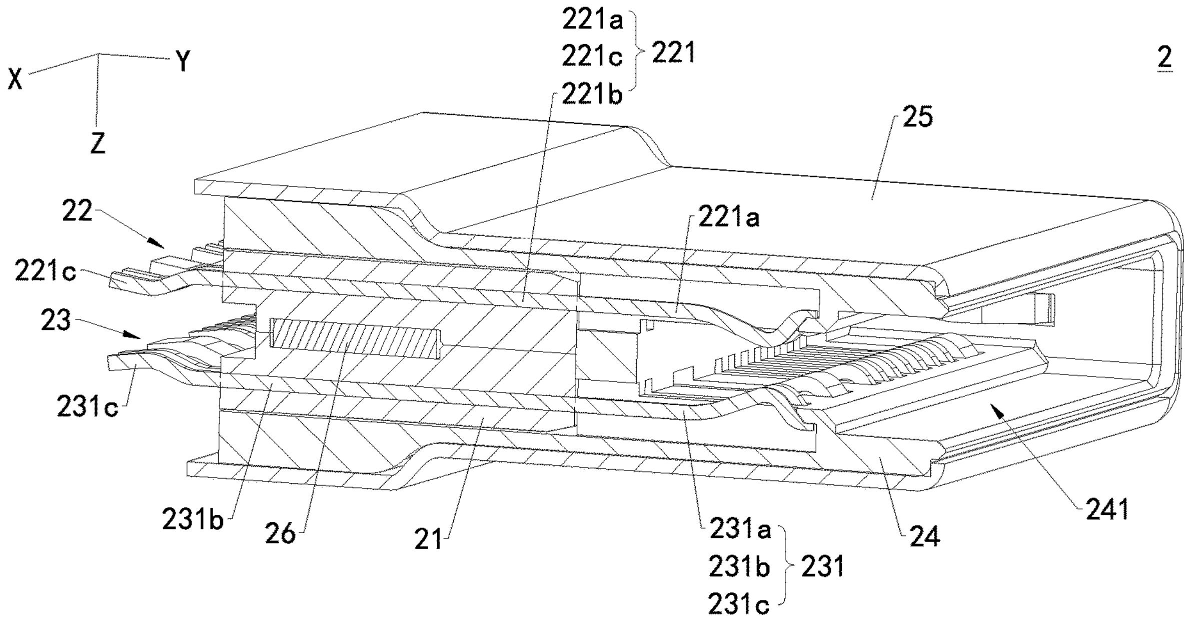
FIG. 23 is a schematic diagram of a cross-sectional structure of the male connector shown in FIG. 21 cut along F-F.

Refer to FIG. 21 to FIG. 23. FIG. 21 is a schematic diagram of a structure of the male connector 2 shown in FIG. 2. FIG. 22 is a schematic diagram of a partial exploded structure of the male connector 2 shown in FIG. 21. FIG. 23 is a schematic diagram of a cross-sectional structure of the male connector 2 shown in FIG. 21 cut along F-F.

In some embodiments, the male connector 2 includes an insulating support 21, a third terminal group 22, a fourth terminal group 23, an insulating housing 24, and a metal shell 25. The third terminal group 22 and the fourth terminal group 23 are stacked and spaced apart from each other, for example, may be arranged in a third direction Z. The third terminal group 22 includes a plurality of terminals 221, and the plurality of terminals 221 are arranged at spacings in a first direction X. The fourth terminal group 23 includes a plurality of terminals 231, and the plurality of terminals 231 are arranged at spacings in the first direction X. Both the third terminal group 22 and the fourth terminal group 23 are fastened to the insulating support 21, and two ends of each of the terminal 221 of the third terminal group 22 and the terminal 231 of the fourth terminal group 23 are exposed relative to an insulating body 11. The insulating housing 24 surrounds the insulating support 21 and is fastened to the insulating support 21, in other words, the insulating support 21 is mounted inside the insulating housing 24. The insulating housing 24 and the insulating support 21 may be fastened to each other through clamping or bonding. A movement space 241 is formed inside the insulating housing 24, one end of the terminal 221 of the third terminal group 22 is located in the movement space 241, and one end of the terminal 231 of the fourth terminal group 23 is located in the movement space 241. The metal shell 25 surrounds the insulating housing 24 and is fastened to the insulating housing 24.

For example, the metal shell 25 may be a complete sleeve structure, so that the male connector 2 can balance an EMI function and a waterproof function, to have better reliability. In this embodiment, the male connector 2 can reach an IPX8 waterproof level by using the foregoing structures.

Figure 24:
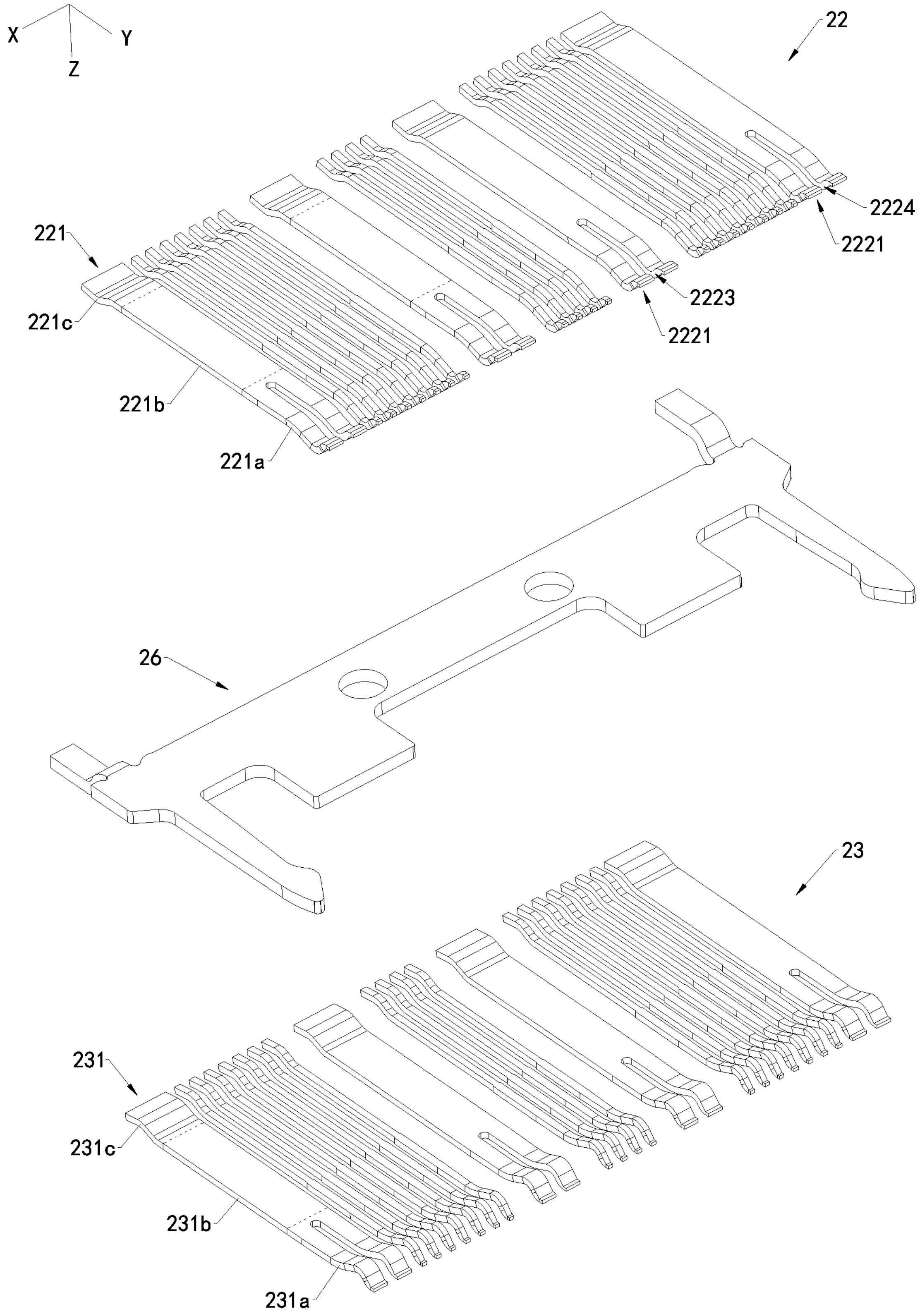
FIG. 24 is a schematic exploded diagram of a partial structure of the male connector shown in FIG. 22.

Refer to FIG. 23 and FIG. 24. FIG. 24 is a schematic exploded diagram of a partial structure of the male connector 2 shown in FIG. 22.

In some embodiments, the male connector 2 further includes a ground plate 26, and the ground plate 26 is fastened to the insulating support 21. The ground plate 26 is located between the third terminal group 22 and the fourth terminal group 23, and is configured to provide a shielding function, to suppress signal crosstalk between the third terminal group 22 and the fourth terminal group 23.

Refer to FIG. 22 and FIG. 23. For example, two sides of the ground plate 26 may be exposed relative to the insulating support 21, and may be exposed relative to the insulating housing 24. Two sides of the metal shell 25 may be connected to the ground plate 26 through laser welding or the like, to implement grounding.

Refer to FIG. 23 and FIG. 24 again. In some embodiments, the terminal 221 of the third terminal group 22 includes an abutting section 221*a*, a connection section 221*b*, and a tail section 221*c*. The connection section 221*b* is connected to one end of the contact section 221*a*. The tail section 221*c* is connected to one end that is of the connection section 221*b* and that is away from the contact section 221*a*, in other words, the connection section 221*b* is connected between the contact section 221*a* and the tail section 221*c*. The terminal 231 of the fourth terminal group 23 includes an abutting section 231*a*, a connection section 231*b*, and a tail section 231*c*. The connection section 231*b* is connected to one end of the contact section 231*a*. The tail section 231*c* is connected to one end that is of the connection section 231*b* and that is away from the contact section 231*a*, in other words, the connection section 231*b* is connected between the contact section 231*a* and the tail section 231*c*. The connection section 221*b* of the terminal 221 of the third terminal group 22 and the connection section 231*b* of the terminal 231 of the fourth terminal group 23 are embedded in the insulating support 21. The abutting section 221*a* of the terminal 221 of the third terminal group 22 and the abutting section 231*a* of the terminal 231 of the fourth terminal group 23 are located in the movement space 241, and a gap is formed between the two. When the male connector 2 is plugged into the female connector 1, a tongue plate 112 of the female connector 1 is inserted between the abutting section 221*a* of the terminal 221 of the third terminal group 22 and the abutting section 231*a* of the terminal 231 of the fourth terminal group 23.

In this application, for terminal design schemes of the third terminal group 22 and the fourth terminal group 23 of the male connector 2, refer to terminal design schemes of the first terminal group 12 and the second terminal group 13 of the female connector 1. Some features of the third terminal group 22 and the fourth terminal group 23 are described below. For other features of the third terminal group 22 and the fourth terminal group 23, refer to related features of the first terminal group 12 and the second terminal group 13 in the foregoing embodiments.

Figure 25:
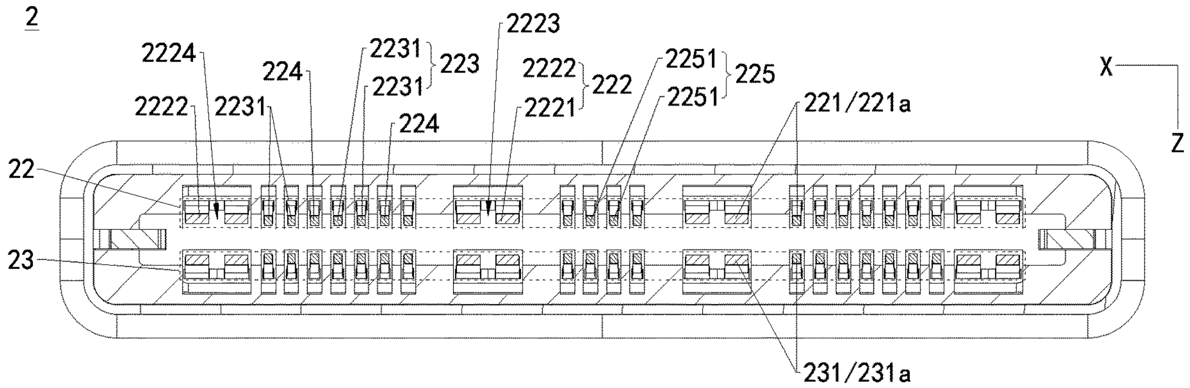
FIG. 25 is a schematic diagram of a cross-sectional structure of the male connector shown in FIG. 21 cut along G-G.

Refer to FIG. 24 and FIG. 25. FIG. 25 is a schematic diagram of a cross-sectional structure of the male connector 2 shown in FIG. 21 cut along G-G. A cross section shown in FIG. 25 passes through abutting sections 221*a* of the plurality of terminals 221 and abutting sections 231*a* of the plurality of terminals 231 of the male connector 2.

In some embodiments, the abutting sections 221*a* of the plurality of terminals 221 of the third terminal group 22 and the abutting sections 231*a* of the plurality of terminals 231 of the fourth terminal group 23 are symmetrically disposed. The terminal 221 of the third terminal group 22 and the terminal 231 of the fourth terminal group 23 may extend substantially along a second direction Y. Cross-sectional areas of a part of the terminals 221 of the third terminal group 22 are larger than cross-sectional areas of the other part of the terminals 221. In the third terminal group 22, spacings between the part of the terminals 221 are the same, or spacings between the part of the terminals 221 are different.

In this application, the plurality of terminals 221 in the third terminal group 22 may be named as different signal terminals based on types of signals transmitted by the plurality of terminals 221. Each signal terminal includes an abutting section, a connection section, and a tail section that are sequentially connected. Locations of the section structures respectively correspond to locations of the abutting section 221*a*, the connection section 221*b*, and the tail section 221*c* of the terminal 221, and details are not described below again. The plurality of terminals 231 of the fourth terminal group 23 may be named as different signal terminals based on types of signals transmitted by the plurality of terminals 231. Each signal terminal includes an abutting section, a connection section and a tail section that are sequentially connected. Locations of section structures respectively correspond to locations of the abutting section 231*a*, the connection section 231*b*, and the tail section 231*c* of the terminal 231, and details are not described below again.

In some embodiments, the third terminal group 22 may include a plurality of power terminal pairs 222 and a plurality of high-speed terminal pairs 223. For example, the third terminal group 22 may include two power terminal pairs 222 and four high-speed terminal pairs 223. The power terminal pair 222 includes a power terminal 2221 and a power return ground terminal 2222. The high-speed terminal pair 223 includes two adjacent high-speed signal terminals 2231, and the high-speed terminal pair 223 may be a differential pair. Cross-sectional areas of abutting sections of the power terminal 2221 and the power return ground terminal 2222 are greater than a cross-sectional area of an abutting section of the high-speed signal terminal 2231.

In this embodiment, the male connector 2 improves a through-current capability by disposing the plurality of power terminal pairs 122, and improves a signal transmission rate by disposing the plurality of high-speed terminal pairs 123. In addition, the cross-sectional areas of the abutting sections of the power terminal 1221 and the power return ground terminal 1222 are set to be larger than the cross-sectional area of the abutting section of the high-speed signal terminal 1231, so that the abutting sections of the power terminal 1221 and the power return ground terminal 1222 have larger cross-sectional areas. Impedance of the power terminal 1221 and the power return ground terminal 1222 is small, and therefore a higher through-current capability is obtained. In addition, the high-speed signal terminal 1231 keeps a small cross-sectional area, which not only avoids increasing an overall interface size of the male connector 2, but also helps to ensure that a high-speed signal has good high-frequency performance. Therefore, the male connector 2 can improve the through-current capacity, and can maintain a small structural size and good high-frequency performance, to meet high power, small volume and high transmission rate requirements.

In some embodiments, cross-sectional areas of connection sections of the power terminal 2221 and the power return ground terminal 2222 are greater than a cross-sectional area of a connection section of the high-speed signal terminal 2231, and cross-sectional areas of tail sections of the power terminal 2221 and the power return ground terminal 2222 are greater than a cross-sectional area of a tail section of the high-speed signal terminal 2231. In this case, the male connector 2 can better meet the high power and high transmission rate requirements.

For example, in the power terminal 2121, the power return ground terminal 2122, and the high-speed signal terminal 2131, cross-sectional areas of a connection section and a tail section are equal to or close to a cross-sectional area of an abutting section, to ensure the through-current capability and high-speed transmission performance of the male connector 2. For example, a cross section of the abutting section of the power terminal 2221 is rectangular, a size thereof in the first direction X may range from 0.8 mm to 1.40 mm, and a size thereof in the third direction Z may be 0.25 mm, for example, may be 1.40 mm×0.25 mm. Alternatively, the size of the cross section of the abutting section of the power terminal 2221 in the first direction X may range from 1.0 mm to 1.81 mm, and the size thereof in the third direction Z may be 0.20 mm. In this embodiment, a through-current capacity of the power terminal 2221 may reach 15 A, to better meet the high power requirement.

A shape and a size of the cross section of the abutting section of the power return ground terminal 2222 are the same as those of the abutting section of the power terminal 2221. A cross section of the abutting section of the high-speed signal terminal 2231 is rectangular, a size thereof in the first direction X is less than or equal to 0.25 mm, and a size thereof in the second direction Y is less than or equal to 0.25 mm, for example, may be 0.20 mm×0.20 mm. A specific size of a cross section of each terminal is not strictly limited in this embodiment of this application.

In some embodiments, refer to FIG. 24 and FIG. 25. In the third terminal group 22, the cross-sectional areas of the abutting sections of the power terminal 2221 and the power return ground terminal 2222 may be greater than a cross-sectional area of an abutting section of another terminal 221, to control the overall interface size while ensuring the through-current capability of the male connector 2, so that the male connector 2 meets the small volume requirement at the same time. For example, in the third terminal group 22, shapes and sizes of cross sections of abutting sections of terminals 221 other than the power terminal 2221 and the power return ground terminal 2222 may be consistent.

In the third terminal group 22, the cross-sectional areas of the connection sections of the power terminal 2221 and the power return ground terminal 2222 may also be greater than a cross-sectional area of a connection section of the another terminal 221. The cross-sectional areas of the tail sections of the power terminal 2221 and the power return ground terminal 2222 may also be greater than a cross-sectional area of a tail section of the another terminal 221.

In some embodiments, refer to FIG. 24 and FIG. 25. A first spacing is formed between the abutting section of the power terminal 2221 and an abutting section of an adjacent terminal 221, a second spacing is formed between the abutting section of the high-speed signal terminal 2231 and an abutting section of an adjacent terminal 221, and the first spacing is greater than the second spacing. It may be understood that power P=current Ix voltage V. To meet the high power requirement of the male connector 2, the power terminal 2221 needs to be loaded with a high voltage. In this embodiment, the spacing between the abutting section of the power terminal 2221 and the abutting section of the adjacent terminal 221 is large, so that a creepage distance between the power terminal 2221 and the adjacent terminal 221 is large enough. In this way, a function failure of the male connector 2 caused by a breakdown phenomenon due to a large voltage on the power terminal 2221 is avoided, so that reliability of the male connector 2 is high. In addition, a high voltage does not need to be loaded on the high-speed signal terminal 2231, and the spacing between the abutting section of the high-speed signal terminal 2231 and the abutting section of the adjacent terminal 221 is small, which helps to make the interface size of the male connector 2 small. Therefore, the male connector 2 has high reliability and a small volume.

For example, if the male connector 2 needs to meet a transmission power of 720 W, when the power terminal 2221 can implement a through-current capability of 15 A, a voltage of 48 V needs to be loaded. The spacing between the abutting section of the power terminal 2221 and the abutting section of the adjacent terminal 221 may be set to 0.90 mm to have a sufficient creepage distance. A spacing between two adjacent terminals 221 of the other terminals 221 may be set to 0.30 mm.

In some embodiments, a spacing between the connection section of the power terminal 2221 and a connection section of the adjacent terminal 221 is greater than a spacing between the connection section of the high-speed signal terminal 2231 and a connection section of the adjacent terminal 221. A spacing between the tail section of the power terminal 2221 and a tail section of the adjacent terminal 221 is greater than a spacing between the tail section of the high-speed signal terminal 2231 and a tail section of the adjacent terminal 221. That is, a spacing between the power terminal 2221 and the adjacent terminal 221 is greater than a spacing between the high-speed signal terminal 2231 and the adjacent terminal 221, to ensure reliability of the male connector 2.

In some embodiments, refer to FIG. 24 and FIG. 25. In the third terminal group 22, the spacing between the abutting section of the power terminal 2221 and the abutting section of the adjacent terminal 221 may be greater than a spacing between abutting sections of the two adjacent terminals 221 of the other terminals 221. The spacing between the connection section of the power terminal 2221 and the connection section of the adjacent terminal 221 may be greater than a spacing between connection sections of the two adjacent terminals 221 of the other terminals 221. The spacing between the tail section of the power terminal 2221 and the tail section of the adjacent terminal 221 may be greater than a spacing between tail sections of the two adjacent terminals 221 of the other terminals 221.

In some embodiments, as shown in FIG. 25, the third terminal group 22 may further include a plurality of isolated ground terminals 224, and adjacent terminals 221 of the high-speed terminal pair 223 include the isolated ground terminal 224. In this embodiment, the isolated ground terminal 224 is disposed beside the high-speed terminal pair 223, to ensure independent high-frequency performance of the differential pair. One of the two adjacent terminals 221 of the high-speed terminal pair 223 may be the isolated ground terminal 224, or both may be the isolated ground terminals 224.

In some embodiments, as shown in FIG. 25, the isolated ground terminal 224 is disposed between the high-speed terminal pair 223 and the power terminal 2221. In this case, the isolated ground terminal 224 is configured to prevent or reduce a magnetic field generated by a current of a power supply in the power terminal 2221 from interfering with the high-speed signal transmitted in the high-speed terminal pair 223.

In some embodiments, as shown in FIG. 25, the third terminal group 22 further includes a low-speed terminal pair 225, and the low-speed terminal pair 225 includes two adjacent low-speed signal terminals 2251. It should be understood that, in this embodiment, the high-speed signal terminal 2231 is configured to transmit a high-speed signal, and the low-speed signal terminal 2251 is configured to transmit a low-speed signal. A high speed and a low speed are relative concepts. For example, the high-speed signal may be a signal whose transmission rate is greater than or equal to 1 Gbps, and the low-speed signal may be a signal whose transmission rate is less than 1 Gbps.

The isolated ground terminal 224 is disposed between the low-speed terminal pair 225 and the high-speed terminal pair 223, and the isolated ground terminal 224 is configured to isolate the low-speed terminal pair 225 from the high-speed terminal pair 223, to reduce or avoid mutual interference between the high-speed signal and the low-speed signal.

In some embodiments, as shown in FIG. 25, at least one terminal 221 is disposed between the power terminal 2221 and the isolated ground terminal 224, and a plurality of terminals 221 are disposed between the power terminal 2221 and the power return ground terminal 2222. In this embodiment, large spacings are set between the power terminal 2221 and the isolated ground terminal 224, and between the power terminal 2221 and the power return ground terminal 2222, to avoid corrosion and security problems caused by foreign matter or liquid inflow because positive and negative electrodes of the male connector 2 are excessively close, and improve reliability of the male connector 2.

In some embodiments, a terminal signal sequence of the third terminal group 22 is opposite to a terminal signal sequence of the fourth terminal group 23. To be specific, transmission signals of the plurality of terminals 221 of the third terminal group 22 and transmission signals of the plurality of terminals 231 of the fourth terminal group 23 are distributed in an obliquely symmetrical manner.

In this embodiment, because the abutting sections 221*a* of the plurality of terminals 221 of the third terminal group 22 and the abutting sections 231*a* of the plurality of terminals 231 of the fourth terminal group 23 are symmetrically disposed, and the terminal signal sequence of the third terminal group 22 is opposite to the terminal signal sequence of the fourth terminal group 23, so that the male connector 2 can be plugged into the female connector 1 forward or backward, to improve user experience.

A quantity of terminals 221 of the third terminal group 22 and a quantity of terminals 231 of the fourth terminal group 23 are the same as a quantity of terminals 121 of the first terminal group 12. For the terminal signal sequence of the third terminal group 22, refer to the terminal signal sequence of the first terminal group 12, and for the terminal signal sequence of the fourth terminal group 23, refer to the terminal signal sequence of the second terminal group 13. For example, the quantity of terminals 221 of the third terminal group 22 is 22, and the terminal signal sequence of the third terminal group 22 is: the power return ground terminal, the high-speed terminal pair, the isolated ground terminal, the high-speed terminal pair, the isolated ground terminal, a first terminal, the power terminal, a configuration terminal, the low-speed terminal pair, a second terminal, the power terminal, an auxiliary terminal, the isolated ground terminal, the high-speed terminal pair, the isolated ground terminal, the high-speed terminal pair, and the power return ground terminal. The first terminal is configured to transmit a low-speed signal. The configuration terminal is used for plugging detection, power supply negotiation, or interface configuration. The low-speed terminal pair includes two adjacent low-speed signal terminals. The second terminal is configured to transmit power or a low-speed signal. The auxiliary terminal is used for high-speed link initialization, HDCP handshake, capability obtaining, or audio backhaul. Other embodiments and details of the terminal signal sequences of the third terminal group 22 and the fourth terminal group 23 are not described herein again.

In this application, through structural design and signal sequence design of the terminal 221 of the third terminal group 22 and the terminal 231 of the fourth terminal group 23 of the male connector 2, the male connector 2 can meet a high power requirement of 300 W to 720 W and a high transmission rate requirement of 80 Gpbs to 192 Gpbs, so as to be better applicable to a communication system 1000. In addition, the male connector 2 may implement forward and backward insertion. This helps to improve user experience of plugging and unplugging.

Refer to FIG. 25. In some embodiments, a height of the abutting section of the power terminal 2221 is less than a height of the abutting section of the high-speed signal terminal 2231, and a height of the abutting section of the power return ground terminal 2222 is less than the height of the abutting section of the high-speed signal terminal 2231. It may be understood that positive force of a terminal is $F=dEbh^3/4L^3$, where h is a thickness, L is a length, b is a width, d is a displacement value, and E is an elastic coefficient. Therefore, the positive force of the terminal is proportional to the width of the terminal and is proportional to the third power of the thickness of the terminal. Positive force of the power terminal 2221 is significantly increased compared with positive force of the adjacent terminal 221 due to thickening and widening of the terminal. This may affect the nearby terminal 221. In this embodiment, the heights of the abutting sections of the power terminal 2221 and the power return ground terminal 2222 are less than the height of the abutting section of the high-speed signal terminal 2231, so that positive force of the power terminal 2221 and the power return ground terminal 2222 are reduced, to be equal to or close to positive force of the high-speed signal terminal 2231. In this way, elastic performance of the power terminal 2221, the power return ground terminal 2222, and the high-speed signal terminal 2231 are similar, and when the male connector 2 is plugged into the female connector 1, these terminals 221 can be in stable contact with the female connector 1, so as to improve connection reliability of a connector assembly 10.

For example, in an embodiment in which the connector assembly 10 meets a power of 720 W, the heights of the abutting sections of the power terminal 2221 and the power return ground terminal 2222 may be at least 0.05 mm lower than the height of the abutting section of the high-speed signal terminal 2231.

In some embodiments, the heights of the abutting sections of the power terminal 2221 and the power return ground terminal 2222 are less than a height of the abutting section of the another terminal 221, so that the positive force of the power terminal 2221 is close to positive force of the another terminal 221 of the male connector 2, to improve reliability of connection between each terminal of the male connector 2 and the female connector 1.

Refer to FIG. 24 and FIG. 25. In some embodiments, the abutting section of the power terminal 2221 may further be provided with a cutting seam 2223, and the cutting seam 2223 extends to an end of the abutting section of the power terminal 2221. The end of the abutting section of the power terminal 2221 is an end that is of the abutting section and that is away from the connection section. In this embodiment, cutting the abutting section of the power terminal 2221 may further reduce the positive force of the power terminal 2221, so that the positive force of the power terminal 2221 is closer to the positive force of the another terminal 221, to improve reliability of connection between each terminal 221 of the male connector 2 and the female connector 1. Similarly, the abutting section of the power return ground terminal 2222 may further be provided with a cutting seam 2224, and the cutting seam 2224 extends to an end of the abutting section of the power return ground terminal 2222.

It may be understood that, in some other embodiments, positive force of the abutting section of the power terminal 2221 and positive force of the abutting section of the power return ground terminal 2222 may be adjusted to a target range by adjusting only heights (in other words, no cutting seams are disposed on the abutting sections), disposing only the cutting seams, or combining with more design manners. This is not strictly limited in this embodiment of this application.

Figure 26:
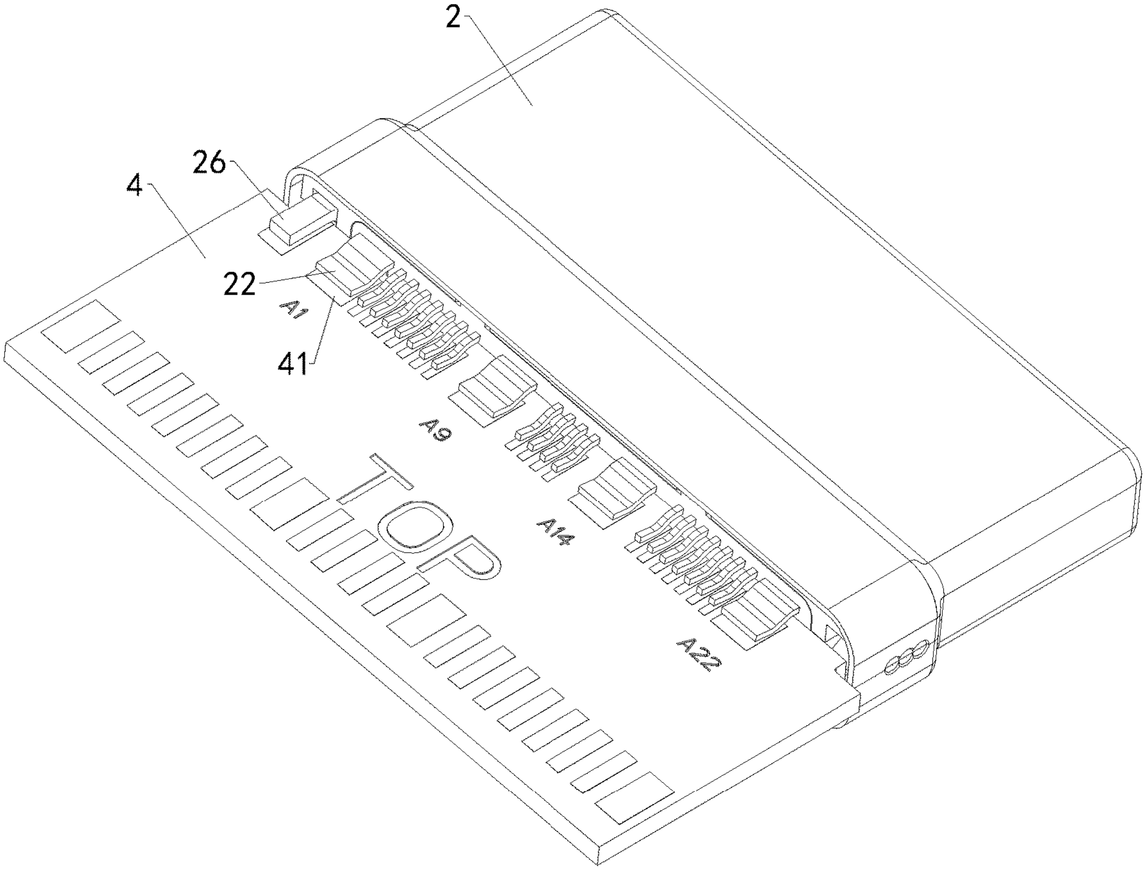
FIG. 26 is a schematic diagram of an assembly structure in which the male connector shown in FIG. 21 is connected to a circuit board.

Refer to FIG. 23 and FIG. 26. FIG. 26 is a schematic diagram of an assembly structure in which the male connector 2 shown in FIG. 21 is connected to a circuit board 4.

In some embodiments, when the male connector 2 is applied to a cable assembly, the cable assembly further includes the circuit board 4 and a cable. The male connector 2 is fixedly and electrically connected to the circuit board 4, and the male connector 2 is further electrically connected to the cable by using the circuit board 4. Specifically, the circuit board 4 is provided with a plurality of solder pads 41, and the plurality of solder pads 41 include solder pads configured to transmit a power signal, a high-speed signal, a ground signal, and another signal. The tail sections of the terminals of the third terminal group 22 and the fourth terminal group 23 of the male connector 2 are welded to the plurality of solder pads 41 on the circuit board 4, so as to electrically connect to the circuit board 4. The ground plate 26 of the male connector 2 is welded to a solder pad that is on the circuit board 4 and that is configured to transmit the ground signal. The circuit board 4 is further provided with some other solder pads, and the solder pads may be configured to electrically connect to the cable of the cable assembly.

The following describes a connection relationship between the male connector 2 and the female connector 1 by using an example with reference to a schematic diagram of an internal structure of the connector assembly 10.

Figure 27:
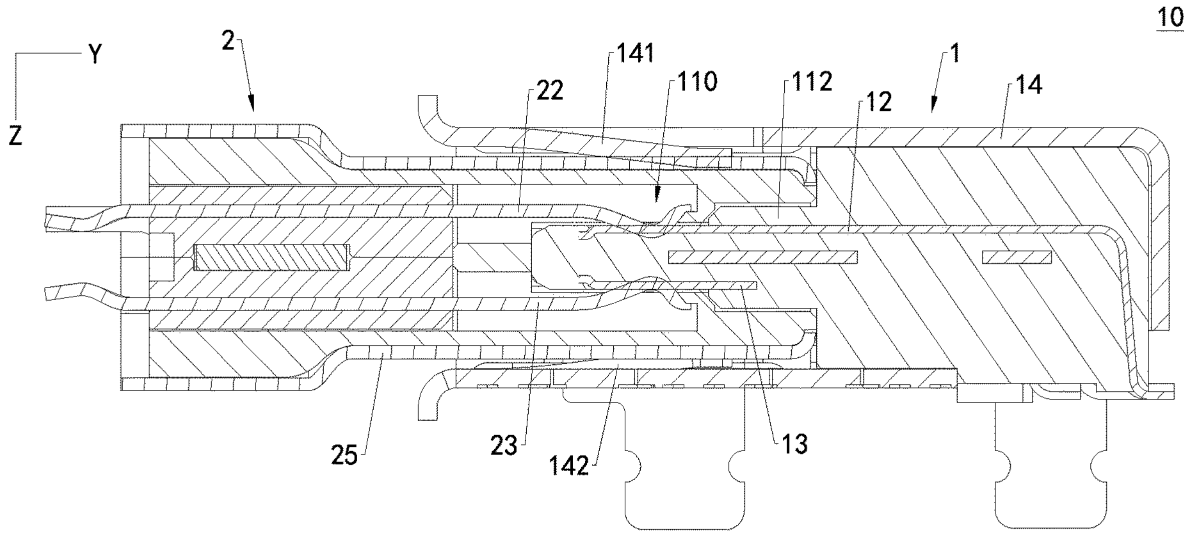
FIG. 27 is a schematic diagram of a cross-sectional structure of the connector assembly shown in FIG. 3 cut along H-H.

FIG. 27 is a schematic diagram of a cross-sectional structure of the connector assembly 10 shown in FIG. 3 cut along H-H.

In some embodiments, a metal housing 14 of a female connector 1 is disposed around a tongue plate 112, and a plugging space 110 is formed between the metal housing 14 and the tongue plate 112. A contact section of a terminal of a first terminal group 12 is fastened to the tongue plate 112 and exposed in the plugging space 110, and a contact section of a terminal of a second terminal group 13 is fastened to the tongue plate 112 and exposed in the plugging space 110. A male connector 2 is partially plugged into the plugging space 110 of the female connector 1, and the tongue plate 112 is inserted between a third terminal group 22 and a fourth terminal group 23. An abutting section of a terminal of the third terminal group 22 is in contact with and electrically connected to the contact section of the terminal of the first terminal group 12, and an abutting section of a terminal of the fourth terminal group 23 is in contact with and electrically connected to the contact section of the terminal of the second terminal group 13.

In this application, contact sections of a plurality of terminals of the first terminal group 12 and contact sections of a plurality of terminals of the second terminal group 13 are symmetrically disposed and terminal signal sequences are opposite, and abutting sections of a plurality of terminals of the third terminal group 22 and abutting sections of a plurality of terminals of the fourth terminal group 23 are symmetrically disposed and terminal signal sequences are opposite, so that the male connector 2 may be plugged forward or backward into the female connector 1, and the connector assembly 10 implements forward and backward insertion functions. This can improve user experience of plugging and unplugging.

To meet high power and high transmission rate requirements of the connector assembly 10, each terminal group (12, 13, 22, and 23) is designed to include a plurality of power terminal pairs and high-speed terminal pairs. In some embodiments, a power of the connector assembly 10 may be in a range of 300 W to 720 W, and a transmission rate may be in a range of 80 Gpbs to 192 Gpbs. In addition, in the connector assembly 10, cross-sectional areas of a power terminal and a power return ground terminal of the power terminal pair of the female connector 1 and the male connector 2 are set to be greater than a cross-sectional area of another terminal, so that the power terminal pair can implement high-power transmission. In addition, interface sizes of the female connector 1 and the male connector 2 are small, which facilitates miniaturization. A high-speed signal terminal of the high-speed terminal pair maintains a small cross-sectional area, which also helps to ensure high-frequency performance of a transmitted signal.

In addition, to improve reliability of the connector assembly 10, arrangement locations of the power terminal pair, the high-speed terminal pair, an isolated ground terminal, and a low-speed terminal pair in each terminal group (12, 13, 22, and 23) are designed.

In addition, in the connector assembly 10, heights and/or shapes of abutting sections of terminals of the third terminal group 22 and the fourth terminal group 23 are further be designed, so that positive force of the terminals are equal or similar. In this way, the abutting sections of the terminals of the third terminal group 22 can be in stable contact with the first terminal group 12, the abutting sections of the terminals of the fourth terminal group 23 can be in stable contact with the second terminal group 13, and an electrical connection relationship between the female connector 1 and the male connector 2 is stable and reliable.

In this application, a first spring plate 141 and a second spring plate 142 of the metal housing 14 of the female connector 1 abut against a metal shell 25 of the male connector 2, and the metal housing 14 and the metal shell 25 jointly implement an EMI function and an EMC function of the connector assembly 10.

Refer to FIG. 1 again. In some embodiments, the communication system 1000 uses the connector assembly 10 in the foregoing embodiments, and high power supply and high-speed signal transmission can be implemented between the smart screen 100 and the set-top box 300, so that the communication system 1000 can meet high-definition playing and multi-functionality requirements. The set-top box 300 may further be provided with another one or more female connectors 3002, configured to connect to another device to transmit data and the like. The set-top box 300 may further be provided with a power cable 3003.

Figure 28:
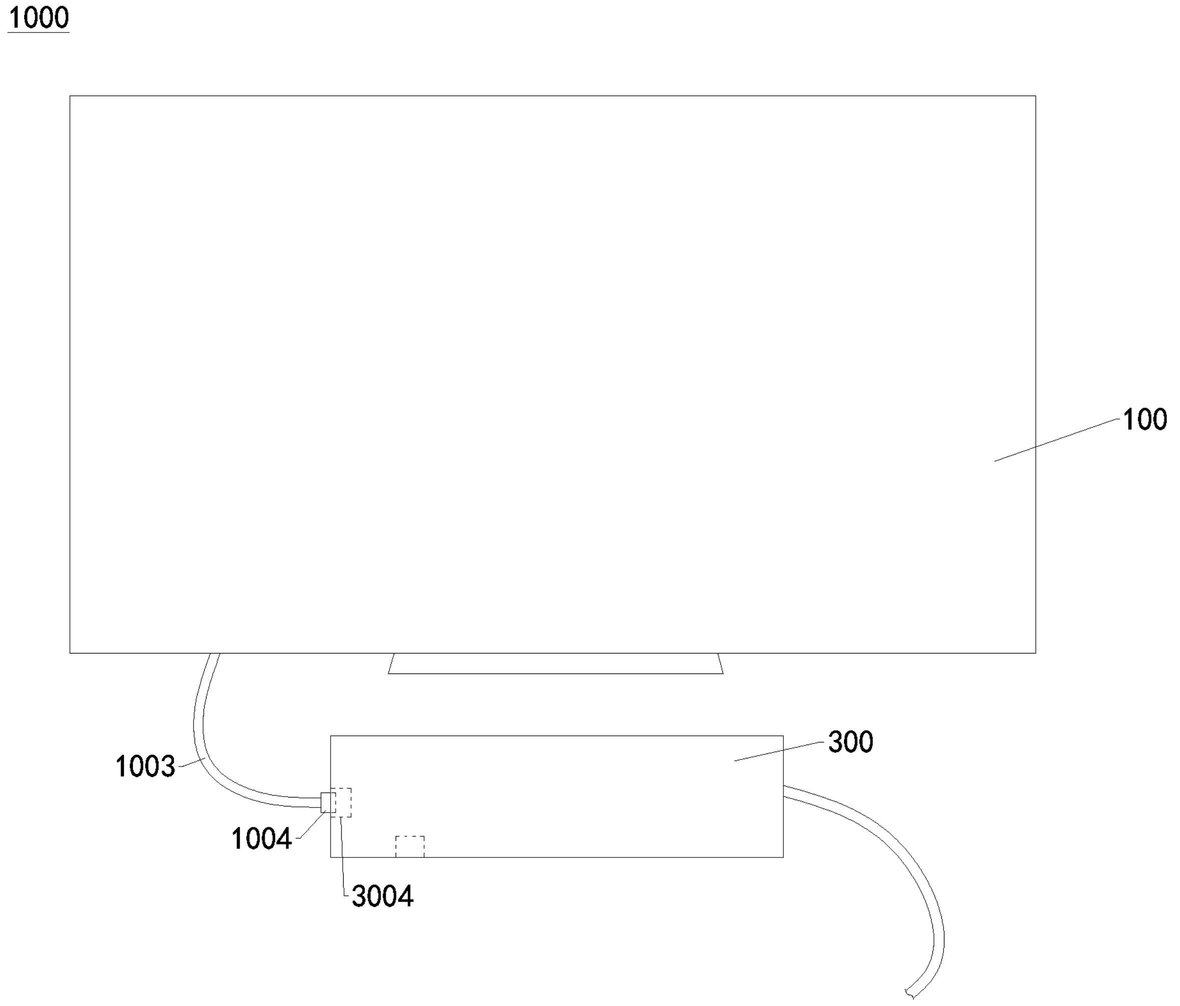
FIG. 28 is a schematic diagram of another communication system according to an embodiment of this application.

FIG. 28 is a schematic diagram of another communication system 1000 according to an embodiment of this application. A difference between this embodiment and the embodiment shown in FIG. 1 lies in that a smart screen 100 includes a plug-in wire 1003, a male connector 1004 is disposed at an end of the plug-in wire 1003, and the male connector 1004 is plugged into a female connector 3004 of a set-top box 300 to implement an electrical connection between the smart screen 100 and the set-top box 300. The male connector 1004 may use the foregoing male connector 2, and the female connector 3004 may use the foregoing female connector 1.

Figure 29:
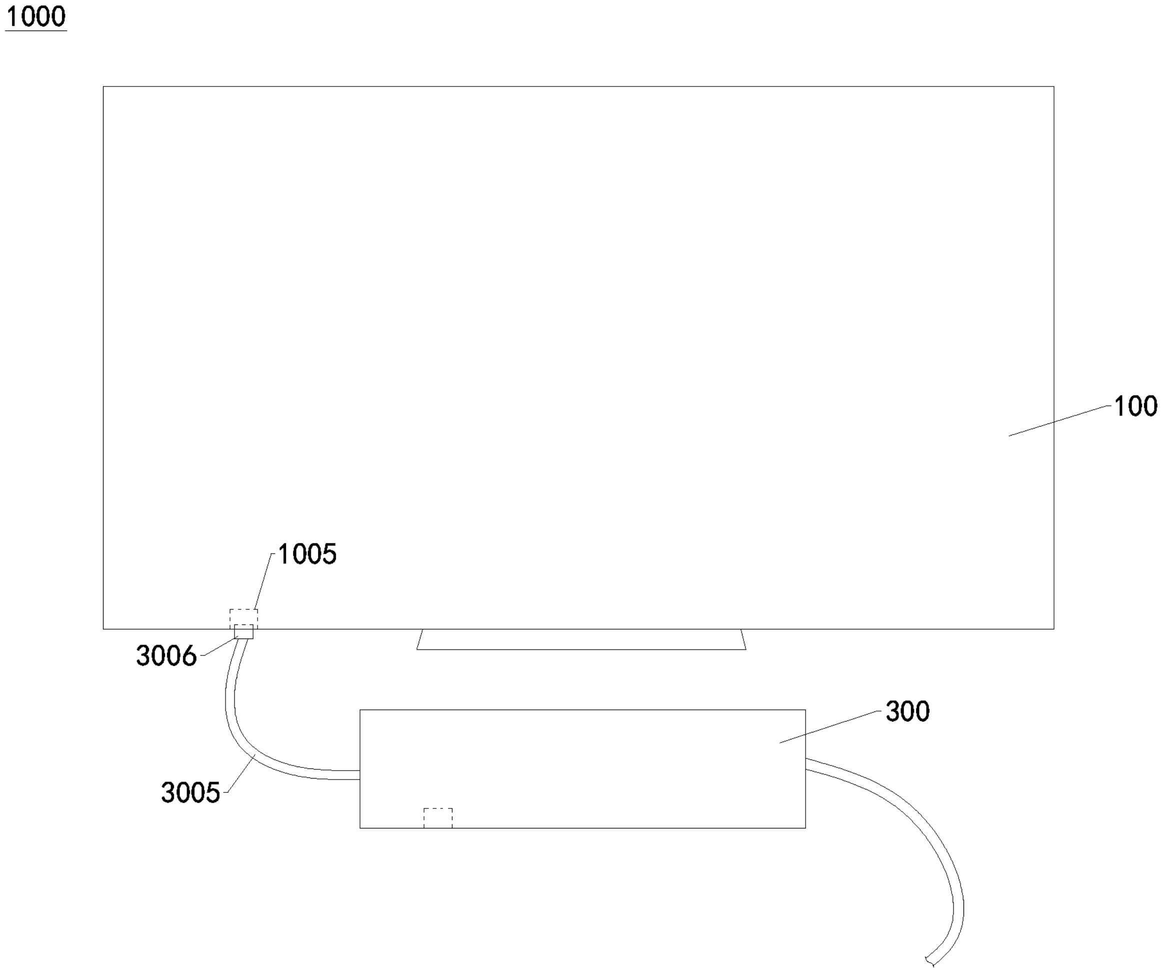
FIG. 29 is a schematic diagram of another communication system according to an embodiment of this application.

FIG. 29 is a schematic diagram of another communication system 1000 according to an embodiment of this application. A difference between this embodiment and the embodiment shown in FIG. 1 lies in that a set-top box 300 includes a plug-in wire 3005, a male connector 3006 is disposed at an end of the plug-in wire 3005, and the male connector 3006 is plugged into a female connector 1005 of a smart screen 100 to implement an electrical connection between the smart screen 100 and the set-top box 300. The male connector 3006 may use the foregoing male connector 2, and the female connector 1005 may use the foregoing female connector 1.

This application further provides a connector assembly. The connector assembly includes the female connector 1 described above, and further includes a male connector adapted to the female connector 1. A structure of the male connector may be different from a structure of the male connector 2 described above.

This application further provides a connector assembly. The connector assembly 10 includes the male connector 2 described above, and further includes a female connector adapted to the male connector 2. A structure of the female connector may be different from a structure of the female connector 1 described above.

This application further provides a device. The device includes the female connector 1 or the male connector 2 described above. The device may be a smart screen, a display, a television, a set-top box, a computer, a game host, or the like.

This application further provides a cable assembly. The cable assembly includes the female connector 1 or the male connector 2 described above.

This application further provides a communication system. The communication system includes a device and a cable assembly. The device includes the female connector 1 described above. The cable assembly includes a cable and the male connector 2 described above. The male connector 2 is electrically connected to the cable, and the male connector 2 is plugged into the female connector 1.

This application further provides a communication system. The communication system includes a device and a cable assembly. The device includes the male connector 2 described above. The cable assembly includes a cable and the female connector 1 described above. The female connector 1 is electrically connected to the cable, and the male connector 2 is plugged into the female connector 1.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A female connector comprising:

a first terminal group; and a second terminal group, wherein each of the first terminal group and the second terminal group comprises multiple terminals, each of the terminals comprises a contact section configured to electrically connect to a male connector, the first terminal group and the second terminal group are stacked and spaced apart from each other, a terminal signal sequence of the first terminal group is opposite to a terminal signal sequence of the second terminal group, contact sections of the terminals of the first terminal group and contact sections of the terminals of the second terminal group are symmetrically disposed, wherein the first terminal group comprises a plurality of power terminal pairs and a plurality of high-speed terminal pairs, each power terminal pair comprises a power terminal and a power return ground terminal, each high-speed terminal pair comprises two adjacent high-speed signal terminals, and cross-sectional areas of contact sections of the power terminal and the power return ground terminal are greater than a cross-sectional area of a contact section of each high-speed signal terminal, and wherein the first terminal group further comprises a plurality of isolated ground terminals, adjacent terminals of a high-speed terminal pair comprise an isolated ground terminal, and each isolated ground terminal is disposed between a high-speed terminal pair and a power terminal.

2. The female connector of claim 1, wherein at least one terminal is disposed between a power terminal and an isolated ground terminal, and a plurality of terminals are disposed between a power terminal and a power return ground terminal.

3. The female connector of claim 1, wherein the first terminal group further comprises a low-speed terminal pair, the low-speed terminal pair comprises two adjacent low-speed signal terminals, and an isolated ground terminal is disposed between the low-speed terminal pair and a high-speed terminal pair.

4. The female connector of claim 1, wherein the contact section of a power terminal and a contact section of an adjacent terminal form a first spacing, a contact section of a high-speed signal terminal and a contact section of an adjacent terminal form a second spacing, and the first spacing is greater than the second spacing.

5. The female connector of claim 1, wherein a quantity of terminals in the first terminal group is 22, and the terminal signal sequence of the first terminal group is: a power return ground terminal, a high-speed terminal pair, an isolated ground terminal, a high-speed terminal pair, an isolated ground terminal, a first terminal, a power terminal, a configuration terminal, a low-speed terminal pair, a second terminal, a power terminal, an auxiliary terminal, an isolated ground terminal, a high-speed terminal pair, an isolated ground terminal, a high-speed terminal pair, and a power return ground terminal, and wherein the first terminal is configured to transmit a low-speed signal or is reserved, the configuration terminal is for plugging detection, power supply negotiation, or interface configuration, the low-speed terminal pair comprises two adjacent low-speed signal terminals, the second terminal is configured to transmit power or a low-speed signal or is reserved, and the auxiliary terminal is for high-speed link initialization, HDCP handshake, capability obtaining, or audio backhaul.

6. The female connector of claim 1, further comprising:

an insulating body; and a metal housing, wherein the insulating body comprises a base body and a tongue plate, the tongue plate is fastened to one side of the base body, the metal housing surrounds the tongue plate and is fixedly connected to the insulating body, and a plugging space is formed between the metal housing and the tongue plate, and wherein each terminal further comprises a connection section connected to one end of the contact section, the connection section of said each terminal is embedded in the base body, the contact section of each terminal is fastened to the tongue plate, and the contact sections of the terminals of the first terminal group and the contact sections of the terminals of the second terminal group are respectively exposed on two sides of the tongue plate.

7. The female connector of claim 6, wherein each terminal further comprises a tail section, the tail section of said each terminal is connected to an end of the connection section and away from the contact section, and the tail section is exposed relative to the insulating body; and cross-sectional areas of connection sections of the power terminal and the power return ground terminal are greater than a cross-sectional area of a connection section of the high-speed signal terminal, and cross-sectional areas of tail sections of the power terminal and the power return ground terminal are greater than a cross-sectional area of a tail section of the high-speed signal terminal.

8. The female connector of claim 7, wherein the metal housing comprises:

a first plate body;

a second plate body disposed oppositely to the first plate body;

a first spring plate; and a second spring plate, wherein the first plate body faces the first terminal group, and the second plate body faces the second terminal group, a first end of the first spring plate is connected to the first plate body, a second end of the first spring plate is bent inward and suspended, a first end of the second spring plate is connected to the second plate body, and a second end of the second spring plate is bent inward and suspended.

9. The female connector of claim 8, wherein the metal housing further comprises:

a first protective boss; and a second protective boss, wherein the first protective boss protrudes on an inner wall of the first plate body, a height of the first protective boss is less than a height of the first spring plate, the second protective boss protrudes on an inner wall of the second plate body, and a height of the second protective boss is less than a height of the second spring plate.

10. The female connector of claim 6, wherein the metal housing comprises:

a first plate body;

a second plate body disposed oppositely to the first plate body;

a first protective boss;

a second protective boss;

a first spring plate; and a second spring plate, wherein the first plate body faces the first terminal group, and the second plate body faces the second terminal group, the first protective boss protrudes on an inner wall of the first plate body, a first end of the first spring plate is connected to the first protective boss, a second end of the first spring plate is bent inward and suspended, the second protective boss protrudes on an inner wall of the second plate body, a first end of the second spring plate is connected to the second protective boss, and a second end of the second spring plate is bent inward and suspended.

11. A male connector comprising:

a first terminal group; and a second terminal group, wherein each of the first terminal group and the second terminal group comprises multiple terminals, each of the terminals comprises an abutting section configured to connect to a female connector, the first terminal group and the second terminal group are stacked and spaced apart from each other, a terminal signal sequence of the first terminal group is opposite to a terminal signal sequence of the second terminal group, and abutting sections of the terminals of the first terminal group, and abutting sections of the terminals of the second terminal group are symmetrically disposed;

the first terminal group comprises a plurality of power terminal pairs and a plurality of high-speed terminal pairs, each power terminal pair comprises a power terminal and a power return ground terminal, each high-speed terminal pair comprises two adjacent high-speed signal terminals, and cross-sectional areas of contact sections of the power terminal and the power return ground terminal are greater than a cross-sectional area of a contact section of each high-speed signal terminal; and the first terminal group further comprises a plurality of isolated ground terminals, adjacent terminals of a high-speed terminal pair comprise an isolated ground terminal, and each isolated ground terminal is disposed between a high-speed terminal pair and a power terminal.

12. The male connector of claim 11, wherein at least one terminal is disposed between a power terminal and an isolated ground terminal, and a plurality of terminals are disposed between a power terminal and a power return ground terminal.

13. The male connector of claim 11, wherein the first terminal group further comprises a low-speed terminal pair comprising two adjacent low-speed signal terminals, and an isolated ground terminal is disposed between the low-speed terminal pair and a high-speed terminal pair.

14. The male connector of claim 11, wherein an abutting section of a power terminal and an abutting section of an adjacent terminal form a first spacing, an abutting section of a high-speed signal terminal and an abutting section of an adjacent terminal form a second spacing, and the first spacing is greater than the second spacing.

15. The male connector of claim 11, wherein a quantity of terminals in the first terminal group is 22, and the terminal signal sequence of the first terminal group is: a power return ground terminal, a high-speed terminal pair, an isolated ground terminal, a high-speed terminal pair, an isolated ground terminal, a first terminal, a power terminal, a configuration terminal, a low-speed terminal pair, a second terminal, a power terminal, an auxiliary terminal, an isolated ground terminal, a high-speed terminal pair, an isolated ground terminal, a high-speed terminal pair, and a power return ground terminal; and the first terminal is configured to transmit a low-speed signal or is reserved, the configuration terminal is for plugging detection, power supply negotiation, or interface configuration, the low-speed terminal pair comprises two adjacent low-speed signal terminals, the second terminal is configured to transmit power or a low-speed signal or is reserved, and the auxiliary terminal is for high-speed link initialization, HDCP handshake, capability obtaining, or audio backhaul.

16. The male connector of claim 11, wherein a height of an abutting section of a power terminal is less than a height of an abutting section of a high-speed signal terminal, and a height of an abutting section of a power return ground terminal is less than a height of an abutting section of a high-speed signal terminal.

17. The male connector of claim 11, wherein an abutting section of a power terminal is provided with a cutting seam extending to an end of the abutting section of the power terminal.

18. The male connector of claim 11, further comprising:

an insulating support;

an insulating housing, and a metal shell, wherein both the first terminal group and the second terminal group are fastened to the insulating support, the insulating housing surrounds the insulating support and is fixedly connected to the insulating support, a movement space is formed inside the insulating housing, the abutting sections of the terminals of the first terminal group and the abutting sections of the terminals of the second terminal group are located in the movement space, and the metal shell surrounds the insulating housing and is fixedly connected to the insulating housing.

19. A cable assembly comprising:

a female connector; and a cable electrically connected to the female connector, wherein the female connector comprises a first terminal group and a second terminal group, each of the first terminal group and the second terminal group comprises multiple terminals, each of the terminals comprises a contact section configured to electrically connect to a male connector, the first terminal group and the second terminal group are stacked and spaced apart from each other, a terminal signal sequence of the first terminal group is opposite to a terminal signal sequence of the second terminal group, contact sections of the terminals of the first terminal group and contact sections of the terminals of the second terminal group are symmetrically disposed, wherein the first terminal group comprises a plurality of power terminal pairs and a plurality of high-speed terminal pairs, each power terminal pair comprises a power terminal and a power return ground terminal, each high-speed terminal pair comprises two adjacent high-speed signal terminals, and cross-sectional areas of contact sections of a power terminal and a power return ground terminal are greater than a cross-sectional area of a contact section of a high-speed signal terminal, and wherein the first terminal group further comprises a plurality of isolated ground terminals, adjacent terminals of a high-speed terminal pair comprise an isolated ground terminal, and each isolated ground terminal is disposed between a high-speed terminal pair and a power terminal.

20. The cable assembly of claim 19, wherein at least one terminal is disposed between a power terminal and an isolated ground terminal, and a plurality of terminals are disposed between a power terminal and a power return ground terminal.

* * * * *